(12) United States Patent
Liu et al.

(10) Patent No.: US 12,671,828 B2
(45) Date of Patent: Jun. 30, 2026

(54) ENCODING AND DECODING METHOD AND APPARATUS

(71) Applicants: HUAWEI TECHNOLOGIES CO., LTD., Shenzhen (CN); PEKING UNIVERSITY, Beijing (CN)

(72) Inventors: Jiaying Liu, Beijing (CN); Dezhao Wang, Beijing (CN); Jing Wang, Beijing (CN); Tiansheng Guo, Beijing (CN); Ze Cui, Beijing (CN); Yunying Ge, Beijing (CN)

(73) Assignees: Huawei Technologies Co., Ltd., Shenzhen (CN); Peking University, Beijing (CN)

( * ) Notice: Subject to any disclaimer, the term of this patent is extended or adjusted under 35 U.S.C. 154(b) by 0 days.

(21) Appl. No.: 18/433,054

(22) Filed: Feb. 5, 2024

(65) Prior Publication Data
US 2024/0205435 A1     Jun. 20, 2024

Related U.S. Application Data

(63) Continuation of application No. PCT/CN2022/109485, filed on Aug. 1, 2022.

(30) Foreign Application Priority Data

Aug. 5, 2021     (CN) .......................... 202110898667.8

(51) Int. Cl.
  *H04N 19/42*          (2014.01)
  *H04N 19/136*        (2014.01)
  (Continued)

(52) U.S. Cl.
  CPC ........... *H04N 19/42* (2014.11); *H04N 19/136* (2014.11); *H04N 19/147* (2014.11); *H04N 19/463* (2014.11); *H04N 19/91* (2014.11)

(58) Field of Classification Search
  CPC ........ G06N 3/02; G06N 3/045; G06N 3/0455; G06N 3/0464; G06N 3/047; G06N 3/048; G06N 3/063; G06N 3/084; H04N 19/136; H04N 19/147; H04N 19/42; H04N 19/463; H04N 19/91
  See application file for complete search history.

(56) References Cited

U.S. PATENT DOCUMENTS

2016/0260014 A1     9/2016   Hagawa et al.
2019/0297326 A1*   9/2019   Reda ......................... G06T 5/20
                            (Continued)

FOREIGN PATENT DOCUMENTS

CN         110913220 A     3/2020
EP         3716158 A2      9/2020
                (Continued)

*Primary Examiner* — Shahan Ur Rahaman
(74) *Attorney, Agent, or Firm* — Leydig, Voit & Mayer, Ltd.

(57)     ABSTRACT

An encoding method includes: first obtaining to-be-encoded data, and then inputting the to-be-encoded data into a first encoding network to obtain a target parameter; then constructing a second encoding network based on the target parameter; next inputting the to-be-encoded data into the second encoding network to obtain a first feature; and finally encoding the first feature to obtain an encoded bitstream.

20 Claims, 16 Drawing Sheets

(51) Int. Cl.
    H04N 19/147    (2014.01)
    H04N 19/463    (2014.01)
    H04N 19/91    (2014.01)

(56) References Cited

U.S. PATENT DOCUMENTS

| | | | |
|---|---|---|---|
| 2019/0306526 A1* | 10/2019 | Cho | G06N 3/047 |
| 2021/0358180 A1* | 11/2021 | Johnston | G06N 3/084 |
| 2022/0329807 A1 | 10/2022 | Xiao et al. | |
| 2022/0353522 A1* | 11/2022 | Ding | H04N 19/132 |

FOREIGN PATENT DOCUMENTS

| | | | |
|---|---|---|---|
| JP | 2017084320 A | 5/2017 | |
| JP | 2022078735 A | 5/2022 | |
| WO | 2019205871 A1 | 10/2019 | |
| WO | 2021135715 A1 | 7/2021 | |

* cited by examiner

ENCODING AND DECODING METHOD AND APPARATUS

CROSS-REFERENCE TO RELATED APPLICATIONS

This application is a continuation of International Application No. PCT/CN2022/109485, filed on Aug. 1, 2022, which claims priority to Chinese Patent Application No. 202110898667.8, filed on Aug. 5, 2021. The disclosures of the aforementioned applications are hereby incorporated by reference in their entireties.

TECHNICAL FIELD

This application relates to the field of artificial intelligence technologies, and in particular, to encoding and decoding methods and apparatuses.

BACKGROUND

With development of science and technology, a quantity and resolution of pictures are increasing. A large quantity of pictures not only require a storage medium with larger capacity, but also require a wider transmission frequency band and longer transmission time, which also becomes a basic problem in picture processing. To improve storage efficiency and transmission efficiency of the picture, the picture with a large amount of data needs to be encoded to compress the picture.

Picture compression based on a neural network can improve picture compression efficiency. Existing neural network-based picture compression methods are mainly classified into a neural network-based picture compression method that requires online training (which is briefly referred to as a method 1) and a neural network-based picture compression method that does not require online training (which is briefly referred to as a method 2). The method 1 has good rate distortion performance, but requires online training, resulting in a low picture compression speed. The method 2 has poor rate distortion performance, but has a high picture compression speed.

SUMMARY

This application provides encoding and decoding methods and apparatuses, to improve rate distortion performance of data encoding and decoding methods without online training. To achieve the foregoing objective, this application uses the following technical solutions.

According to a first aspect, this application provides an encoding method. The method includes: first obtaining to-be-encoded data, and then inputting the to-be-encoded data into a first encoding network to obtain a target parameter; then constructing a second encoding network based on the target parameter; next inputting the to-be-encoded data into the second encoding network to obtain a first feature; and finally encoding the first feature to obtain an encoded bitstream.

In an existing encoding method, an encoding network (namely, the second encoding network) extracts a content feature (namely, the first feature) of the to-be-encoded data based on a fixed parameter weight, and then encodes the content feature into a bitstream (namely, the encoded bitstream) and sends the bitstream to a decoder side. The decoder side performs decoding and reconstruction on the bitstream to obtain decoded data. In the conventional technology, a parameter weight of the encoding network is not related to the to-be-encoded data. However, in the encoding method provided in this application, the to-be-encoded data is first input into the first encoding network, the first encoding network generates a parameter weight of the second encoding network based on the to-be-encoded data, and then the parameter weight of the second encoding network is dynamically adjusted based on an obtained weight, so that the parameter weight of the second encoding network is related to the to-be-encoded data, an expression capability of the second encoding network is increased, and decoded data obtained by the decoder side through decoding and reconstruction on the bitstream obtained by encoding the first feature is closer to the to-be-encoded data. This improves rate distortion performance of an encoding and decoding network.

Optionally, the target parameter is all or a part of parameter weights for convolution and non-linear activation of the second encoding network.

In a possible implementation, the encoding the first feature to obtain an encoded bitstream includes: rounding the first feature to obtain an integer value of the first feature, performing probability estimation on the integer value of the first feature to obtain estimated probability distribution of the integer value of the first feature, and performing entropy encoding on the integer value of the first feature based on the estimated probability distribution of the integer value of the first feature to obtain the encoded bitstream.

Entropy encoding is performed on the integer value of the first feature based on the estimated probability distribution of the integer value of the first feature to form the bitstream. This can reduce encoding redundancy for outputting the first feature, and further reduce a data transmission amount in a data encoding or decoding (compression) process.

In a possible implementation, the performing probability estimation on the integer value of the first feature to obtain estimated probability distribution of the integer value of the first feature includes: performing probability estimation on the integer value of the first feature based on first information to obtain the estimated probability distribution of the integer value of the first feature, where the first information includes at least one of context information and side information.

The probability distribution is estimated based on the context information and the side information, so that accuracy of the obtained estimated probability distribution can be improved. This reduces a bit rate in an entropy encoding process, and reduces entropy encoding overheads.

According to a second aspect, this application provides a decoding method. The method includes: first obtaining a to-be-decoded bitstream; then decoding the to-be-decoded bitstream to obtain an integer value of a first feature and an integer value of a second feature; further then inputting the integer value of the second feature into a first decoding network to obtain a target parameter; next constructing a second decoding network based on the target parameter; and finally inputting the integer value of the first feature into the second decoding network to obtain decoded data. The integer value of the first feature is used to obtain the decoded data, and the integer value of the second feature is used to obtain the target parameter.

In an existing decoding method, a decoding network (namely, the second decoding network) performs decoding and reconstruction on a content value feature (namely, the integer value of the first feature) of the to-be-encoded data based on a fixed parameter weight to obtain the decoded data. In the conventional technology, a parameter weight of the decoding network is not related to to-be-decoded data. However, in this application, a content feature and a model feature (namely, the first feature and the second feature) of the to-be-decoded data are encoded into the to-be-decoded bitstream, then a decoder side decodes the to-be-decoded bitstream to obtain the integer value of the second feature, the integer value of the second feature is input into the first decoding network to obtain a parameter weight of the second decoding network, and then the parameter weight of the second decoding network is dynamically adjusted based on the parameter weight, so that the parameter weight of the second decoding network is related to the to-be-decoded data, an expression capability of the second decoding network is improved, and the decoded data obtained by the second decoding network through decoding and reconstruction is closer to the to-be-encoded data. This improves rate distortion performance of the encoding and decoding network.

Optionally, the target parameter is all or a part of parameter weights for convolution and non-linear activation of the second encoding network.

Optionally, the to-be-decoded bitstream includes a first to-be-decoded bitstream and a second to-be-decoded bitstream.

In a possible implementation, the decoding the to-be-decoded bitstream to obtain an integer value of a first feature and an integer value of a second feature includes: decoding the first to-be-decoded bitstream to obtain the integer value of the first feature; and decoding the second to-be-decoded bitstream to obtain the integer value of the second feature.

In a possible implementation, the decoding the first to-be-decoded bitstream to obtain the integer value of the first feature includes: performing probability estimation on the integer value of the first feature in the first to-be-decoded bitstream to obtain estimated probability distribution of the integer value of the first feature, and performing entropy decoding on the first to-be-decoded bitstream based on the estimated probability distribution of the integer value of the first feature to obtain the integer value of the first feature.

In a possible implementation, the performing probability estimation on the integer value of the first feature in the first to-be-decoded bitstream to obtain estimated probability distribution of the integer value of the first feature includes: performing probability estimation on the integer value of the first feature in the first to-be-decoded bitstream based on first information to obtain the estimated probability distribution of the integer value of the first feature, where the first information includes at least one of context information and side information.

In a possible implementation, the decoding the second to-be-decoded bitstream to obtain the integer value of the second feature includes: performing probability estimation on the integer value of the second feature in the second to-be-decoded bitstream to obtain estimated probability distribution of the integer value of the second feature, and performing entropy decoding on the second to-be-decoded bitstream based on the estimated probability distribution of the integer value of the second feature to obtain the integer value of the second feature.

In a possible implementation, the performing probability estimation on the integer value of the second feature in the second to-be-decoded bitstream to obtain estimated probability distribution of the integer value of the second feature includes: performing probability estimation on the integer value of the second feature in the second to-be-decoded bitstream based on the first information to obtain the estimated probability distribution of the integer value of the second feature, where the first information includes at least one of the context information and the side information.

According to a third aspect, this application provides a decoding method. The method includes: first obtaining a to-be-decoded bitstream; then decoding the to-be-decoded bitstream to obtain an integer value of a first feature; further then inputting the integer value of the first feature into a first decoding network to obtain a target parameter; next constructing a second decoding network based on the target parameter; and finally inputting the integer value of the first feature into the second decoding network to obtain decoded data. The first feature is used to obtain the decoded data and the target parameter.

In an existing decoding method, a decoding network (namely, the second decoding network) performs decoding and reconstruction on a content value feature (namely, the integer value of the first feature) of the to-be-encoded data based on a fixed parameter weight to obtain the decoded data. In the conventional technology, a parameter weight of the decoding network is not related to to-be-decoded data. However, in this application, the to-be-decoded bitstream obtained by encoding a feature (namely, the first feature) of the to-be-decoded data is decoded to obtain the integer value of the first feature, the integer value of the first feature is input into a first decoding network to obtain a parameter weight of the second decoding network, and then the parameter weight of the second decoding network is dynamically adjusted based on the parameter weight, so that the parameter weight of the second decoding network is related to the to-be-decoded data, an expression capability of the second decoding network is improved, and the decoded data obtained by the second decoding network through decoding and reconstruction is closer to to-be-encoded data. This improves rate distortion performance of an encoding and decoding network.

Optionally, the target parameter all or a part of parameter weights for convolution and non-linear activation of the second encoding network.

In a possible implementation, the decoding the to-be-decoded bitstream to obtain an integer value of a first feature includes: performing probability estimation on the integer value of the first feature in the to-be-decoded bitstream to obtain estimated probability distribution of the integer value of the first feature, and performing entropy decoding on the to-be-decoded bitstream based on the estimated probability distribution of the integer value of the first feature to obtain the integer value of the first feature.

In a possible implementation, the performing probability estimation on the integer value of the first feature in the to-be-decoded bitstream to obtain estimated probability distribution of the integer value of the first feature includes: performing probability estimation on the integer value of the first feature in the to-be-decoded bitstream based on first information to obtain the estimated probability distribution of the integer value of the first feature, where the first information includes at least one of context information and side information.

According to a fourth aspect, this application provides an encoding apparatus. The encoding apparatus includes a processing circuit. The processing circuit is configured to: obtain to-be-encoded data; input the to-be-encoded data into a first encoding network to obtain a target parameter; construct a second encoding network based on the target parameter; input the to-be-encoded data into the second encoding network to obtain a first feature; and encode the first feature to obtain an encoded bitstream.

Optionally, the target parameter is all or a part of parameter weights for convolution and non-linear activation of the second encoding network.

In a possible implementation, the processing circuit is specifically configured to: round the first feature to obtain an integer value of the first feature, perform probability estimation on the integer value of the first feature to obtain estimated probability distribution of the integer value of the first feature, and perform entropy encoding on the integer value of the first feature based on the estimated probability distribution of the integer value of the first feature to obtain the encoded bitstream.

In a possible implementation, the processing circuit is specifically configured to perform probability estimation on the integer value of the first feature based on first information to obtain the estimated probability distribution of the integer value of the first feature, where the first information includes at least one of context information and side information.

According to a fifth aspect, this application provides a decoding apparatus. The decoding apparatus includes a processing circuit. The processing circuit is configured to: obtain a to-be-decoded bitstream; decode the to-be-decoded bitstream to obtain an integer value of a first feature and an integer value of a second feature, where the integer value of the first feature is used to obtain decoded data, and the integer value of the second feature is used to obtain a target parameter; input the integer value of the second feature into a first decoding network to obtain the target parameter; construct a second decoding network based on the target parameter; and input the integer value of the first feature into the second decoding network to obtain the decoded data.

Optionally, the target parameter is all or a part of parameter weights for convolution and non-linear activation of the second encoding network.

Optionally, the to-be-decoded bitstream includes a first to-be-decoded bitstream and a second to-be-decoded bitstream.

In a possible implementation, the processing circuit is specifically configured to: decode the first to-be-decoded bitstream to obtain the integer value of the first feature, and decode the second to-be-decoded bitstream to obtain the integer value of the second feature.

In a possible implementation, the processing circuit is specifically configured to perform probability estimation on the integer value of the first feature in the first to-be-decoded bitstream to obtain estimated probability distribution of the integer value of the first feature, and perform entropy decoding on the first to-be-decoded bitstream based on the estimated probability distribution of the integer value of the first feature to obtain the integer value of the first feature.

In a possible implementation, the processing circuit is specifically configured to perform probability estimation on the integer value of the first feature in the first to-be-decoded bitstream based on first information to obtain the estimated probability distribution of the integer value of the first feature, where the first information includes at least one of context information and side information.

In a possible implementation, the processing circuit is specifically configured to: perform probability estimation on the integer value of the second feature in the second to-be-decoded bitstream to obtain estimated probability distribution of the integer value of the second feature, and perform entropy decoding on the second to-be-decoded bitstream based on the estimated probability distribution of the integer value of the second feature to obtain the integer value of the second feature.

In a possible implementation, the processing circuit is specifically configured to perform probability estimation on the integer value of the second feature in the second to-be-decoded bitstream based on the first information to obtain the estimated probability distribution of the integer value of the second feature, where the first information includes at least one of the context information and the side information.

According to a sixth aspect, this application provides a decoding apparatus. The decoding apparatus includes a processing circuit. The processing circuit is configured to: obtain a to-be-decoded bitstream; decode the to-be-decoded bitstream to obtain an integer value of a first feature, where the integer value of the first feature is used to obtain decoded data and a target parameter; input the integer value of the first feature into a first decoding network to obtain the target parameter; construct a second decoding network based on the target parameter; and input the integer value of the first feature into the second decoding network to obtain the decoded data.

Optionally, the target parameter is all or a part of parameter weights for convolution and non-linear activation of the second encoding network.

In a possible implementation, the processing circuit is specifically configured to: perform probability estimation on the integer value of the first feature in the to-be-decoded bitstream to obtain estimated probability distribution of the integer value of the first feature, and perform entropy decoding on the to-be-decoded bitstream based on the estimated probability distribution of the integer value of the first feature to obtain the integer value of the first feature.

In a possible implementation, the processing circuit is specifically configured to perform probability estimation on the integer value of the first feature in the to-be-decoded bitstream based on first information to obtain the estimated probability distribution of the integer value of the first feature, where the first information includes at least one of context information and side information.

According to a seventh aspect, an embodiment of this application further provides an encoder. The encoder includes at least one processor, and when the at least one processor executes program code or instructions, the method in any one of the first aspect or the possible implementations of the first aspect is implemented.

Optionally, the encoder may further include at least one memory, and the at least one memory is configured to store the program code or the instructions.

According to an eighth aspect, an embodiment of this application further provides a decoder. The decoder includes at least one processor, and when the at least one processor executes program code or instructions, the method in any one of the second aspect or the possible implementations of the second aspect is implemented.

Optionally, the decoder may further include at least one memory, and the at least one memory is configured to store the program code or the instructions.

According to a ninth aspect, an embodiment of this application further provides a chip, including an input interface, an output interface, and at least one processor. Optionally, the chip further includes a memory. The at least one processor is configured to execute code in the memory. When the at least one processor executes the code, the chip implements the method in any one of the first aspect or the possible implementations of the first aspect.

Optionally, the chip may be an integrated circuit.

According to a tenth aspect, an embodiment of this application further provides a terminal. The terminal includes the foregoing encoding apparatus, decoding apparatus, encoder, decoder, or chip.

According to an eleventh aspect, this application further provides a computer-readable storage medium, configured to store a computer program. The computer program is configured to implement the method in any one of the first aspect or the possible implementations of the first aspect.

According to a twelfth aspect, an embodiment of this application further provides a computer program product including instructions. When the computer program product runs on a computer, the computer implements the method in any one of the first aspect or the possible implementations of the first aspect.

The encoding apparatus, the decoding apparatus, the encoder, the decoder, the computer storage medium, the computer program product, and the chip provided in embodiments are all configured to perform the methods provided above. Therefore, for beneficial effect that can be achieved, refer to the beneficial effect of the method provided above. Details are not described herein again.

BRIEF DESCRIPTION OF DRAWINGS

To describe technical solutions in embodiments of this application more clearly, the following briefly describes accompanying drawings for describing embodiments. It is clear that the accompanying drawings in the following description show merely some embodiments of this application, and a person of ordinary skill in the art may still derive other accompanying drawings from these accompanying drawings without creative efforts.

DESCRIPTION OF EMBODIMENTS

Figure 1A:
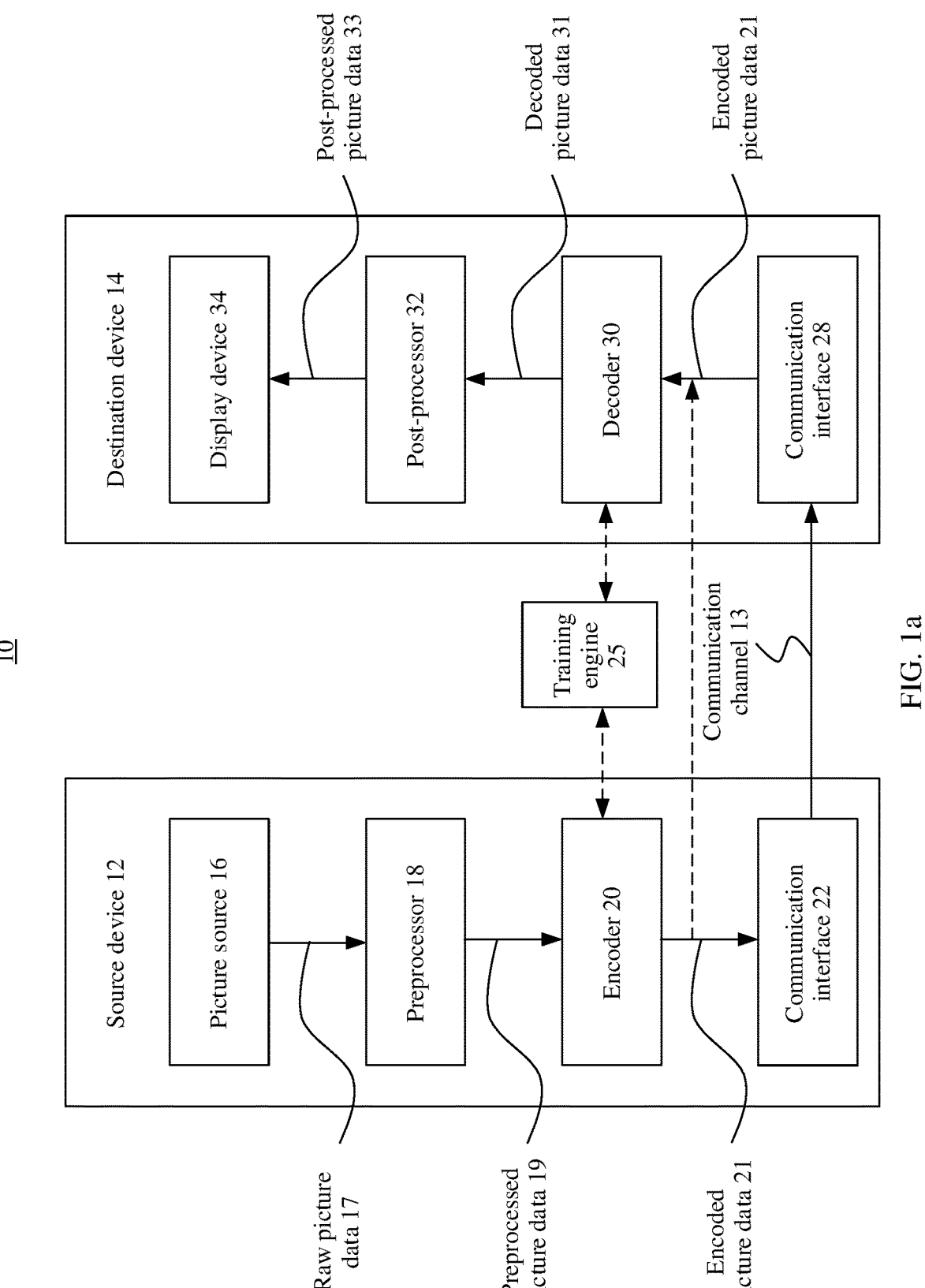
FIG. 1a is an example block diagram of a coding system according to an embodiment of this application.

The following clearly describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and accompanying drawings of this application, the terms "first", "second", and the like are intended to distinguish between different objects or distinguish between different processing of a same object, but do not indicate a particular order of the objects.

In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes another unlisted step or unit, or optionally further includes another inherent step or unit of the process, the method, the system, the product, or the device.

It should be noted that, in descriptions of embodiments of this application, the word "example" or "for example" is used to represent giving an example, an illustration, or a description. Any embodiment or design scheme described as an "example" or "for example" in embodiments of this application should not be explained as having more advantages than another embodiment or design scheme. Exactly, use of the term "example", "for example", or the like is intended to present a relative concept in a specific manner.

In the descriptions of this application, unless otherwise specified, "a plurality of" means two or more than two.

Embodiments of this application provide an AI-based data compression/decompression technology, in particular, provide a neural network-based data compression/decompression technology, and specifically provide an encoding and decoding technology, to improve a conventional hybrid data encoding and decoding system.

Data encoding and decoding include data encoding and data decoding. Data encoding is performed at a source side (or usually referred to as an encoder side), and usually includes processing (for example, compressing) raw data to reduce the amount of data required for representing the raw data (for more efficient storage and/or transmission). Data decoding is performed at a destination side (or usually referred to as a decoder side), and usually includes inverse processing relative to the encoder side to reconstruct raw data. "Encoding and decoding" of data in embodiments of this application should be understood as "encoding" or "decoding" of data. A combination of an encoding part and a decoding part is also referred to as CODEC (encoding and decoding).

In a case of lossless data coding, the raw data can be reconstructed. In other words, the reconstructed raw data has same quality as the raw data (assuming that no transmission loss or other data loss occurs during storage or transmission). In a case of lossy data coding, further compression is performed through, for example, quantization, to reduce the amount of data required for representing the raw data, which cannot be totally reconstructed at the decoder side. In other words, quality of the reconstructed raw data is lower or worse than quality of the raw data.

Embodiments of this application may be applied to video data, picture data, audio data, integer data, and other data having a compression/decompression requirement. The following describes embodiments of this application by using coding of the video data (which is briefly referred to as video coding) as an example. For other types of data (for example, the picture data, the audio data, the integer data, and the other data having the compression/decompression requirement), refer to the following descriptions. It should be noted that, compared with video coding, in a process of coding data such as the audio data and the integer data, the data does not need to be divided into blocks, but the data may be directly coded.

Video coding usually indicates processing of a sequence of pictures that form a video or a video sequence. In the field of video coding, the terms "picture (picture)", "frame (frame)", and "image (image)" may be used as synonyms.

Several video coding standards are used for "lossy hybrid video coding" (that is, spatial and temporal prediction in a pixel domain is combined with 2D transform coding for applying quantization in a transform domain). Each picture of a video sequence is usually partitioned into a set of non-overlapping blocks, and coding is usually performed at a block level. In other words, at the encoder, a video is usually processed, that is, encoded, at a block (video block) level. For example, a prediction block is generated through spatial (intra picture) prediction and temporal (inter picture) prediction, the prediction block is subtracted from a current block (block being processed or to be processed) to obtain a residual block, and the residual block is transformed in the transform domain and quantized to reduce the amount of data that is to be transmitted (compressed). At the decoder side, an inverse processing part compared to the encoder is applied to an encoded block or a compressed block to reconstruct the current block for representation. Furthermore, the encoder duplicates the decoder processing step, so that the encoder and the decoder generate same prediction (for example, intra prediction and inter prediction) and/or pixel reconstruction, for processing, that is, coding subsequent blocks.

In the following embodiments of a coding system 10, an encoder 20 and a decoder 30 are described based on FIG. 1a to FIG. 3.

FIG. 1a is an example block diagram of the coding system 10 according to an embodiment of this application, for example, a video coding system 10 (or the coding system 10 for short) that may utilize techniques of this application. A video encoder 20 (or the encoder 20 for short) and a video decoder 30 (or the decoder 30 for short) of the video coding system 10 represent devices that may be configured to perform techniques in accordance with various examples described in this application.

As shown in FIG. 1a, the coding system 10 includes a source device 12 configured to provide encoded picture data 21 such as encoded pictures, to a destination device 14 for decoding the encoded picture data 21.

The source device 12 includes the encoder 20, and may additionally, that is, optionally, include a picture source 16, a preprocessor (or preprocessing unit) 18, for example, a picture preprocessor, and a communication interface (or communication unit) 22.

The picture source 16 may include or be any type of picture capturing device, for example a camera for capturing a real-world picture, and/or any type of a picture generating device, for example a computer-graphics processor for generating a computer animated picture, or any type of other device for obtaining and/or providing a real-world picture, a computer generated picture (for example, a screen content, a virtual reality (VR) picture) and/or any combination thereof (for example, an augmented reality (AR) picture). The picture source may be any type of memory or storage storing any of the aforementioned pictures.

In order to distinguish processing performed by the preprocessor (or preprocessing unit) 18, a picture (or picture data) 17 may also be referred to as a raw picture (or raw picture data) 17.

The preprocessor 18 is configured to receive the raw picture data 17 and to preprocess the raw picture data 17, to obtain a preprocessed picture (or preprocessed picture data) 19. The preprocessing performed by the preprocessor 18 may, for example, include trimming, color format conversion (for example, from RGB to YCbCr), color correction, or de-noising. It can be understood that the preprocessing unit 18 may be an optional component.

The video encoder (or encoder) 20 is configured to receive the preprocessed picture data 19 and provide the encoded picture data 21 (further details are described below, for example, based on FIG. 2).

The communication interface 22 of the source device 12 may be configured to receive the encoded picture data 21 and to transmit the encoded picture data 21 (or any further processed version thereof) via a communication channel 13 to another device, for example, the destination device 14 or any other device, for storage or direct reconstruction.

The destination device 14 includes the decoder 30, and may additionally, that is, optionally, include a communication interface (or communication unit) 28, a post-processor (or post-processing unit) 32, and a display device 34.

The communication interface 28 of the destination device 14 is configured to directly receive the encoded picture data 21 (or any further processed version thereof) from the source device 12 or any other source device such as a storage device, and provide the encoded picture data 21 to the decoder 30. For example, the storage device is an encoded picture data storage device.

The communication interface 22 and the communication interface 28 may be configured to transmit or receive the encoded picture data (or encoded data) 21 via a direct communication link between the source device 12 and the destination device 14, for example, a direct wired or wireless connection, or via any type of network, for example, a wired or wireless network or any combination thereof, or any type of private and public network, or any type of combination thereof.

The communication interface 22 may be, for example, configured to package the encoded picture data 21 into an appropriate format, for example, packets, and/or process the encoded picture data using any type of transmission encoding or processing for transmission via a communication link or communication network.

The communication interface 28, corresponding to the communication interface 22, may be, for example, configured to receive the transmitted data and process the transmission data using any type of corresponding transmission decoding or processing and/or de-packaging to obtain the encoded picture data 21.

Both the communication interface 22 and the communication interface 28 may be configured as unidirectional communication interfaces as indicated by the arrow for the communication channel 13 in FIG. 1*a* pointing from the source device 12 to the destination device 14, or bi-directional communication interfaces, and may be configured, for example, to send and receive messages, for example, to set up a connection, to acknowledge and exchange any other information related to the communication link and/or data transmission, for example, encoded picture data transmission.

The video decoder (or decoder) 30 is configured to receive the encoded picture data 21 and provide decoded picture data (or decoded picture data) 31 (further details are described below, for example, based on FIG. 3).

The post-processor 32 is configured to post-process the decoded picture data 31 (also referred to as reconstructed picture data), for example, the decoded picture, to obtain post-processed picture data 33, for example, a post-processed picture. The post-processing performed by the post-processing unit 32 may include, for example, color format conversion (for example, from YCbCr to RGB), color correction, trimming, or re-sampling, or any other processing, for example, for preparing the decoded picture data 31 for display, for example, by the display device 34.

The display device 34 is configured to receive the post-processed picture data 33 for displaying the picture, for example, to a user or viewer. The display device 34 may be or include any type of display for representing the reconstructed picture, for example, an integrated or external display or monitor. For example, the display may include a liquid crystal display (LCD), an organic light emitting diode (OLED) display, a plasma display, a projector, a micro LED display, liquid crystal on silicon (LCoS), a digital light processor (DLP), or any type of other display.

The coding system 10 further includes a training engine 25. The training engine 25 is configured to train the encoder 20 (especially an entropy encoding unit 270 of the encoder 20) or the decoder 30 (e.g., an entropy decoding unit 304 of the decoder 30), to perform entropy encoding on a to-be-encoded picture block based on estimated probability distribution obtained through estimation. For detailed description of the training engine 25, refer to the following method embodiments.

Although FIG. 1*a* shows the source device 12 and the destination device 14 as separate devices, a device embodiment may alternatively include both the source device 12 and the destination device 14 or functions of both the source device 12 and the destination device 14, namely, the source device 12 or corresponding function and the destination device 14 or corresponding function. In these embodiments, the source device 12 or corresponding function and the destination device 14 or corresponding function may be implemented by the same hardware and/or software or by separate hardware and/or software or any combination thereof.

As will be apparent for the skilled person based on the description, the existence and (exact) division into different units or functions in the source device 12 and/or the destination device 14 shown in FIG. 1*a* may vary depending on an actual device and application.

Figure 1B:
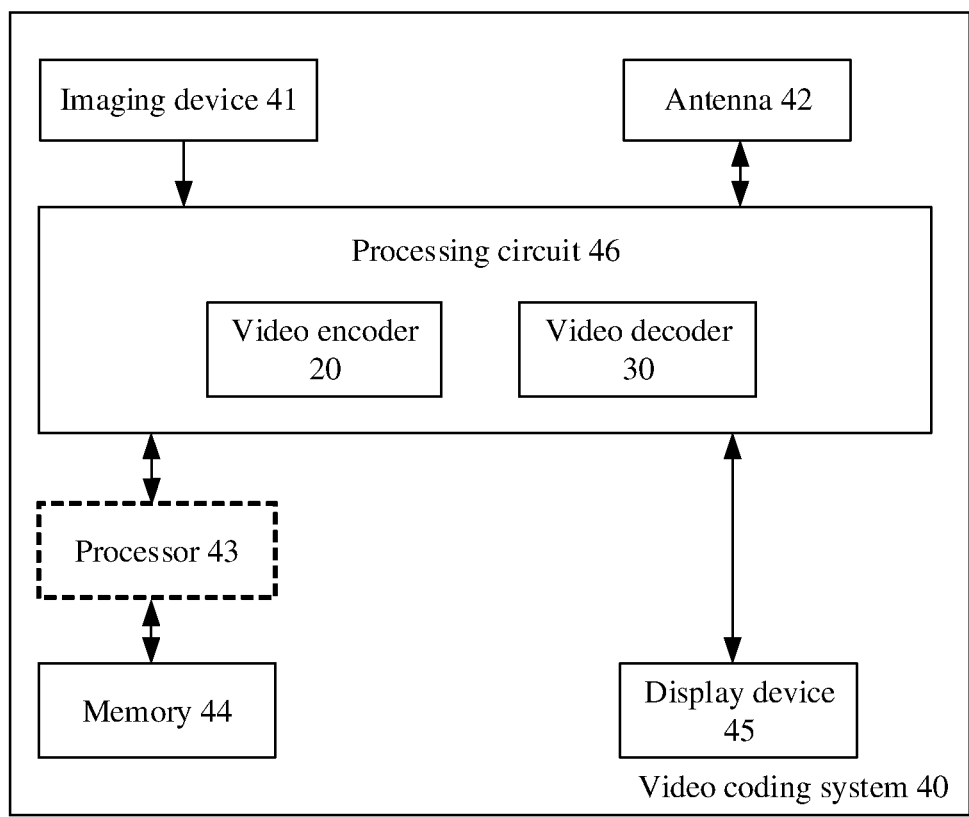
FIG. 1b is an example block diagram of a video coding system according to an embodiment of this application.
Figure 5:
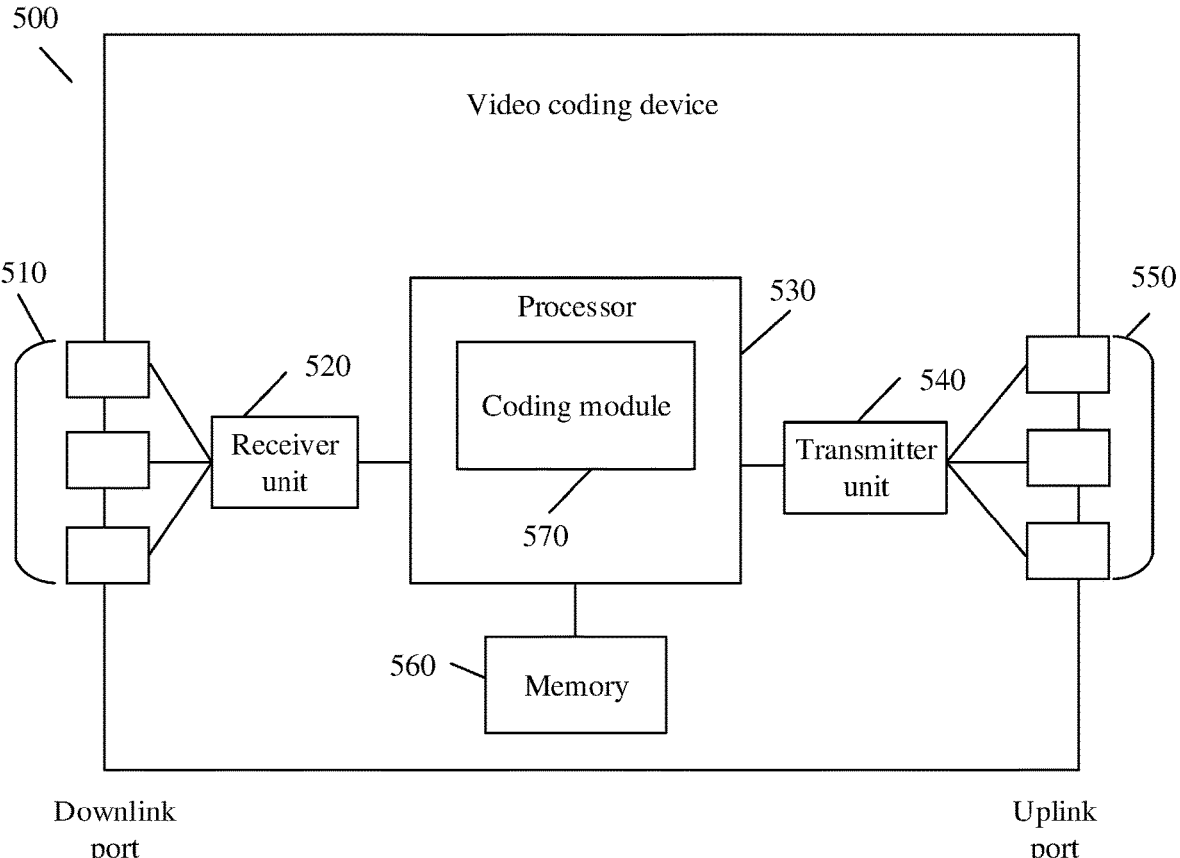
FIG. 5 is an example block diagram of a video coding device according to an embodiment of this application.

FIG. 1*b* is an example block diagram of a video coding system 40 according to an embodiment of this application. The encoder 20 (for example, the video encoder 20) or the decoder 30 (for example, the video decoder 30) or both the encoder 20 and the decoder 30 may be implemented by a processing circuit of the video coding system 40 shown in FIG. 1*b*, for example, one or more microprocessors, a digital signal processor (DSP), an application-specific integrated circuit (ASIC), a field-programmable gate array (FPGA), discrete logic, hardware, a video coding dedicated processor or any combination thereof. Refer to FIG. 2 and FIG. 3. FIG. 2 is an example block diagram of a video encoder according to an embodiment of this application, and FIG. 3 is an example block diagram of a video decoder according to an embodiment of this application. The encoder 20 may be implemented by a processing circuit 46 to embody the various modules described with reference to the encoder 20 in FIG. 2 and/or any other encoder system or subsystem described in this specification. The decoder 30 may be implemented by the processing circuit 46 to embody the various modules described with reference to the decoder 30 in FIG. 3 and/or any other decoder system or subsystem described in this specification. The processing circuit 46 may be configured to perform the various operations described below. As shown in FIG. 5, if the techniques are implemented partially in software, a device may store instructions for the software in a suitable non-transitory computer-readable storage medium and may execute the instructions in hardware using one or more processors to perform the techniques of this application. Either of the video encoder 20 and the video decoder 30 may be integrated as a part of a combined encoder/decoder (CODEC) in a single device, for example, as shown in FIG. 1*b*.

The source device 12 and the destination device 14 may include any of a wide range of devices, including any type of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content service servers or content delivery servers), a broadcast receiver device, a broadcast transmitter device, a monitor device, or the like and may use no or any type of operating system. The source device 12 and the destination device 14 may also be devices in a cloud computing scenario, for example, virtual machines in the cloud computing scenario. In some cases, the source device 12 and the destination device 14 may be equipped with components for wireless communication. Therefore, the source device 12 and the destination device 14 may be wireless communication devices.

A virtual scenario application (APP), such as a virtual reality (VR) application, an augmented reality (AR) application, or a mixed reality (MR) application may be installed on each of the source device 12 and the destination device 14, and the VR application, the AR application, or the MR application may be run based on a user operation (for example, tapping, touching, sliding, shaking, or voice control). The source device 12 and the destination device 14 each may capture a picture/video of any object in an environment by using a camera and/or a sensor, and then display a virtual object on a display device based on the captured picture/video. The virtual object may be a virtual object (namely, an object in a virtual environment) in a VR scenario, an AR scenario, or an MR scenario.

It should be noted that, in this embodiment of this application, the virtual scenario applications in the source device 12 and the destination device 14 may be built-in applications of the source device 12 and the destination device 14, or may be applications that are provided by a third-party service provider and that are installed by a user. This is not specifically limited herein.

In addition, a real-time video transmission application, for example, a live broadcast application, may be installed on each of the source device 12 and the destination device 14. The source device 12 and the destination device 14 each may capture a picture/video by using the camera, and then display the captured picture/video on the display device.

In some cases, the video coding system 10 shown in FIG. 1*a* is merely an example and the techniques of this application are applicable to video coding settings (for example, video encoding or video decoding) that do not necessarily include any data communication between an encoding device and a decoding device. In other examples, data is retrieved from a local memory, streamed over a network, or the like. A video encoding device may encode data and store encoded data into the memory, and/or a video decoding device may retrieve data from the memory and decode the data. In some examples, encoding and decoding are performed by devices that do not communicate with each other, but simply encode data into a memory and/or retrieve data from the memory and decode the data.

FIG. 1*b* is the example block diagram of the video coding system 40 according to this embodiment of this application. As shown in FIG. 1*b*, the video coding system 40 may include an imaging device 41, the video encoder 20, and the video decoder 30 (and/or a video encoder/decoder implemented by the processing circuit 46), an antenna 42, one or more processors 43, one or more memories 44, and/or a display device 45.

As shown in FIG. Tb, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit 46 may include application-specific integrated circuit (ASIC) logic, a graphics processing unit, a general-purpose processor, or the like. The video coding system 40 may also include the optional processor 43. The optional processor 43 may similarly include application-specific integrated circuit (ASIC) logic, a graphics processing unit, a general-purpose processor, or the like. In addition, the memory 44 may be any type of memory, for example, a volatile memory (for example, a static random-access memory (SRAM) or a dynamic random-access memory (DRAM)) or a nonvolatile memory (for example, a flash memory). In a non-limitative example, the memory 44 may be implemented by a cache memory. In other examples, the processing circuit 46 may include a memory (for example, a cache) for implementing a picture buffer.

In some examples, the video encoder 20 implemented by the logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may be included in the video encoder 20 implemented by the processing circuit 46, to implement various modules described with reference to FIG. 2 and/or any other encoder system or subsystem described in this specification. The logic circuit may be configured to perform various operations described in this specification.

In some examples, the video decoder 30 may be implemented by the processing circuit 46 in a similar manner, to implement various modules described with reference to the video decoder 30 in FIG. 3 and/or any other decoder system or subsystem described in this specification. In some examples, the video decoder 30 implemented by the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may be included in the video decoder 30 implemented by the processing circuit 46, to implement various modules described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame encoding described in this specification, for example, data related to encoding partitioning (for example, a transform coefficient or a quantized transform coefficient, an optional indicator (as described), and/or data defining the encoding partitioning). The video coding system 40 may further include the video decoder 30 that is coupled to the antenna 42 and that is configured to decode the encoded bitstream. The display device 45 is configured to present a video frame.

It should be understood that in this embodiment of this application, for the example described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may entropy-encode the syntax element into an encoded video bitstream. In such examples, the video decoder 30 may parse such syntax element and correspondingly decode the related video data.

For ease of description, embodiments of this application are described by referring to versatile video coding (VVC) reference software or high-efficiency video coding (HEVC) developed by the joint collaboration team on video coding (JCT-VC) of the ITU-T video coding experts group (VCEG) and the ISO/IEC motion picture experts group (MPEG). A person of ordinary skill in the art understands that embodiments of this application are not limited to the HEVC or the VVC.

Encoder and Encoding Method

Figure 2:
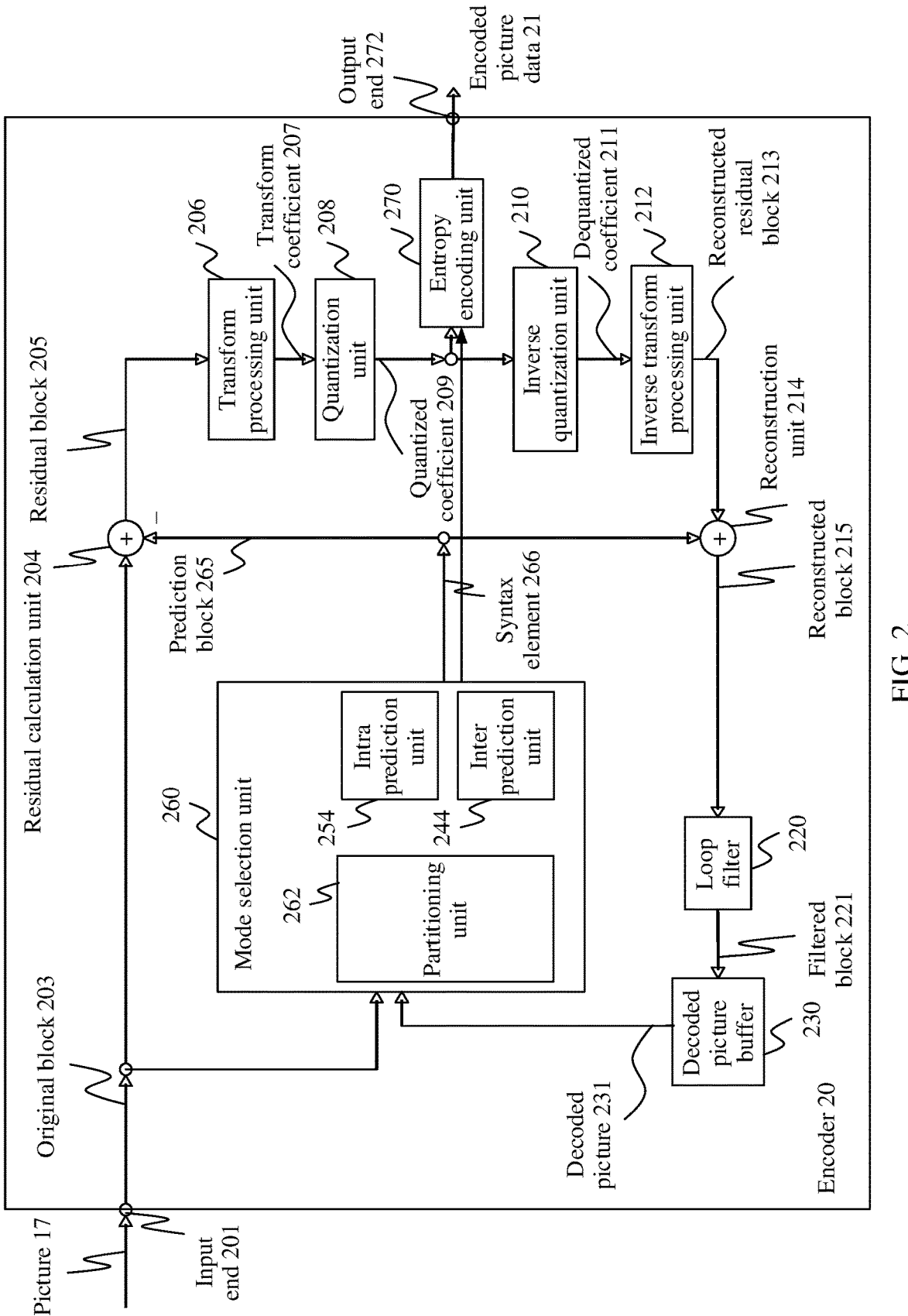
FIG. 2 is an example block diagram of a video encoder according to an embodiment of this application.

As shown in FIG. 2, the video encoder 20 includes an input end (or input interface) 201, a residual calculation unit 204, a transform processing unit 206, a quantization unit 208, an inverse quantization unit 210, an inverse transform processing unit 212, a reconstruction unit 214, a loop filter 220, a decoded picture buffer (DPB) 230, a mode selection unit 260, an entropy encoding unit 270, and an output end (or output interface) 272. The mode selection unit 260 may include an inter prediction unit 244, an intra prediction unit 254 and a partitioning unit 262. The inter prediction unit 244 may include a motion estimation unit and a motion compensation unit. The video encoder 20 shown in FIG. 2 may also be referred to as a hybrid video encoder or a video encoder based on a hybrid video codec.

Refer to FIG. 2. The inter prediction unit is a trained target model (also referred to as a neural network). The neural network is configured to process an input picture, a picture area, or a picture block, to generate a predictor of the input picture block. For example, a neural network for inter prediction is configured to receive the input picture, picture area or picture block, and generate the predictor of the input picture, picture area or picture block.

The residual calculation unit 204, the transform processing unit 206, the quantization unit 208, and the mode selection unit 260 form a forward signal path of the encoder 20, whereas the inverse quantization unit 210, the inverse transform processing unit 212, the reconstruction unit 214, a buffer 216, the loop filter 220, the decoded picture buffer (DPB) 230, the inter prediction unit 244, and the intra prediction unit 254 form a backward signal path of the encoder. The backward signal path of the encoder 20 corresponds to the signal path of the decoder (refer to decoder 30 in FIG. 3). The inverse quantization unit 210, the inverse transform processing unit 212, the reconstruction unit 214, the loop filter 220, the decoded picture buffer 230, the inter prediction unit 244, and the intra prediction unit 254 also form a "built-in decoder" of the video encoder 20.
Picture and Picture Partitioning (Picture and Block)

The encoder 20 may be configured to receive, via an input end 201, a picture (or picture data) 17, for example, a picture in a sequence of pictures forming a video or video sequence. The received picture or picture data may also be a pre-processed picture (or pre-processed picture data) 19. For ease of simplicity, the following description refers to the picture 17. The picture 17 may also be referred to as a current picture or to-be-encoded picture (in particular in video coding to distinguish the current picture from other pictures, for example, previously encoded and/or decoded pictures of a same video sequence, namely, a video sequence which also includes the current picture).

A (digital) picture is or may be considered as a two-dimensional array or matrix of samples with intensity values. A sample in the array may also be referred to as a pixel (or pel) (short form of a picture element). Quantities of samples in horizontal and vertical directions (or axes) of the array define a size and/or resolution of the picture. For representation of color, three color components are usually used, to be specific, the picture may be represented as or include three sample arrays. In an RBG format or color space, a picture includes corresponding red, green, and blue sample arrays. However, in video coding, each pixel is usually represented in a luminance/chrominance format or color space, for example, YCbCr, which includes a luminance component indicated by Y (sometimes indicated by L) and two chrominance components indicated by Cb and Cr. The luminance (luma) component Y represents luminance or gray level intensity (for example, both are the same in a gray-scale picture), and the two chrominance (chroma) components Cb and Cr represent chrominance or color information components. Accordingly, a picture in a YCbCr format includes a luminance sample array of luminance sample values (Y), and two chrominance sample arrays of chrominance values (Cb and Cr). A picture in an RGB format may be converted or transformed into a picture in the YCbCr format and vice versa. The process is also referred to as color transformation or conversion. If a picture is monochrome, the picture may include only a luminance sample array. Accordingly, a picture may be, for example, an array of luminance samples in a monochrome format or an array of luminance samples and two corresponding arrays of chrominance samples in 4:2:0, 4:2:2, and 4:4:4 color formats.

In an embodiment, an embodiment of the video encoder 20 may include a picture partitioning unit configured to partition the picture 17 into a plurality of (typically non-overlapping) picture blocks 203. These blocks may also be referred to as root blocks, macro blocks (H.264/AVC), coding tree blocks (CTBs), or coding tree units (CTUs) in the H.265/HEVC and VVC standards. The partitioning unit may be configured to use a same block size for all pictures of a video sequence and a corresponding grid defining the block size, or to change a block size between pictures or subsets or groups of pictures, and partition each picture into corresponding blocks.

In other embodiments, the video encoder may be configured to directly receive the block 203 of the picture 17, for example, one, several or all blocks forming the picture 17. The picture block 203 may also be referred to as a current picture block or a to-be-encoded picture block.

Like the picture 17, the picture block 203 again is or may be considered as a two-dimensional array or matrix of samples with intensity values (sample values), although of a smaller dimension than the picture 17. In other words, the block 203 may include one sample array (for example, a luminance array in a case of a monochrome picture 17, or a luminance or chrominance array in a case of a color picture) or three sample arrays (for example, one luminance array and two chrominance arrays in a case of a color picture 17) or any other quantity and/or type of arrays depending on the color format used. Quantities of samples in horizontal and vertical directions (or axes) of the block 203 define the size of the block 203. Accordingly, a block may be an M×N (M columns×N rows) array of samples, or an M×N array of transform coefficients.

In an embodiment, the video encoder 20 shown in FIG. 2 may be configured to encode the picture 17 block by block, for example, encoding and prediction are performed on each block 203.

In an embodiment, the video encoder 20 shown in FIG. 2 may be further configured to partition and/or encode the picture by using slices (also referred to as video slices), where the picture may be partitioned or encoded by using one or more slices (typically non-overlapping). Each slice may include one or more blocks (for example, coding tree units CTUs) or one or more groups of blocks (for example, tiles in the H.265/HEVC/VVC standard and bricks in the VVC standard).

In an embodiment, the video encoder 20 shown in FIG. 2 may be further configured to partition and/or encode the picture by using slices/tile groups (also referred to as video tile groups) and/or tiles (also referred to as video tiles). The picture may be partitioned or encoded by using one or more slices/tile groups (typically non-overlapping), and each slice/tile group may include one or more blocks (for example, CTUs) or one or more tiles. Each tile may be of a rectangular shape and may include one or more blocks (for example, CTUs), for example, complete or fractional blocks.

Residual Calculation

The residual calculation unit 204 may be configured to calculate a residual block 205 based on the picture block (an original block) 203 and a prediction block 265 (further details about the prediction block 265 are provided later), for example, by subtracting sample values of the prediction block 265 from sample values of the picture block 203, sample by sample (pixel by pixel) to obtain the residual block 205 in a sample domain.

Transform

The transform processing unit 206 is configured to apply a transform, for example, a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in H.265/HEVC. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints, for example, the scale factor being a power of two for a shift operation, a bit depth of the transform coefficient, and a tradeoff between accuracy and implementation costs. For example, a specific scale factor is specified for the inverse transform by, for example, the inverse transform processing unit 212 at an encoder side 20 (and a corresponding inverse transform by, for example, an inverse transform processing unit 312 at a decoder side 30), and correspondingly, a corresponding scale factor may be specified for the forward transform by, for example, the transform processing unit 206 at the encoder side 20.

In an embodiment, the video encoder 20 (correspondingly, the transform processing unit 206) may be configured to output transform parameters, for example, types of one or more transforms, for example, directly or after encoding or compressing performed by the entropy encoding unit 270, so that, for example, the video decoder 30 may receive and use the transform parameters for decoding.

Quantization

The quantization unit 208 may be configured to quantize the transform coefficients 207 to obtain quantized transform coefficients 209, for example, by applying scalar quantization or vector quantization. The quantized transform coefficient 209 may also be referred to as a quantized residual coefficient 209.

A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An appropriate quantization step may be indicated by a quantization parameter (QP). For example, the quantization parameter may be an index to a predefined set of appropriate quantization steps. For example, a smaller quantization parameter may correspond to finer quantization (a smaller quantization step) and a larger quantization parameter may correspond to coarser quantization (a larger quantization step), or vice versa. The quantization may include division by a quantization step and corresponding and/or inverse dequantization, for example, by the inverse quantization unit 210, may include multiplication by the quantization step. Embodiments according to some standards such as the HEVC may be configured to use the quantization parameter to determine the quantization step. Generally, the quantization step may be calculated based on the quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In one example implementation, a scale of the inverse transform may be combined with a scale of the dequantization. Alternatively, customized quantization tables may be used and signaled from the encoder to the decoder, for example, in a bitstream. The quantization is a lossy operation, where a larger quantization step indicates a larger loss.

In an embodiment, the video encoder 20 (correspondingly, the quantization unit 208) may be configured to output a quantization parameter (QP), for example, directly or after encoding or compressing performed by the entropy encoding unit 270, so that, for example, the video decoder 30 may receive and use the quantization parameter for decoding.

Inverse Quantization

The inverse quantization unit 210 is configured to apply the inverse quantization of the quantization unit 208 on the quantized coefficients to obtain dequantized coefficients 211, for example, apply, based on or by using a same quantization step as the quantization unit 208, the inverse of a quantization scheme applied by the quantization unit 208. The dequantized coefficients 211 may also be referred to as dequantized residual coefficients 211 and correspond, although usually different from the transform coefficients due to a loss by quantization, to the transform coefficients 207.

Inverse Transform

The inverse transform processing unit 212 is configured to apply the inverse transform of the transform applied by the transform processing unit 206, for example, an inverse discrete cosine transform (DCT) or an inverse discrete sine transform (DST), to obtain a reconstructed residual block 213 (or corresponding dequantized coefficients 213) in the sample domain. The reconstructed residual block 213 may also be referred to as a transform block 213.

Reconstruction

The reconstruction unit 214 (for example, a summer 214) is configured to add the transform block 213 (namely, the reconstructed residual block 213) to the prediction block 265 to obtain a reconstructed block 215 in the sample domain, for example, by adding sample values of the reconstructed residual block 213 and the sample values of the prediction block 265.

Filtering

The loop filter unit 220 (or "loop filter" 220 for short) is configured to filter the reconstructed block 215 to obtain a filtered block 221, or in general, to filter reconstructed samples to obtain filtered sample values. For example, the loop filter unit is configured to smooth pixel transitions or improve video quality. The loop filter unit 220 may include one or more loop filters such as a deblocking filter, a sample-adaptive offset (SAO) filter or one or more other filters, for example, an adaptive loop filter (ALF), a noise suppression filter (NSF), or any combination thereof. In an example, the loop filter unit 220 may include a deblocking filter, a SAO filter and an ALF filter. The order of the filtering process may be the deblocking filter, the SAO filter and the ALF filter. In another example, a process called luminance mapping with chrominance scaling (luma mapping with chroma scaling, LMCS) (namely, the adaptive in-loop reshaper) is added. This process is performed before deblocking. In another example, a deblocking filter process may also be applied to internal sub-block edges, for example, affine sub-block edges, ATMVP sub-block edges, sub-block transform (SBT) edges, and intra sub-partition (ISP) edges. Although the loop filter unit 220 is shown in FIG. 2 as being a loop filter, in other configurations, the loop filter unit 220 may be implemented as a post loop filter. The filtered block 221 may also be referred to as a filtered reconstructed block 221.

In an embodiment, the video encoder 20 (correspondingly, the loop filter unit 220) may be configured to output a loop filter parameter (such as a SAO filter parameter, an ALF filter parameter, or an LMCS parameter), for example, directly or after entropy encoding performed by the entropy encoding unit 270, so that, for example, the decoder 30 may receive and use same or different loop filter parameters for decoding.

Decoded Picture Buffer

The decoded picture buffer (DPB) 230 may be a reference picture memory that stores reference picture data for use in video data encoding by the video encoder 20. The DPB 230 may be formed by any one of a variety of memory devices, such as a dynamic random-access memory (DRAM), including a synchronous DRAM (SDRAM), a magnetoresistive RAM (MRAM), a resistive RAM (RRAM), or another type of memory device. The decoded picture buffer 230 may be configured to store one or more filtered blocks 221. The decoded picture buffer 230 may be further configured to store other previously filtered blocks, for example, previously reconstructed and filtered blocks 221, of a same current picture or of different pictures, for example, previously reconstructed pictures, and may provide complete previously reconstructed, for example, decoded pictures (and corresponding reference blocks and samples) and/or a partially reconstructed current picture (and corresponding reference blocks and samples), for example for inter prediction. The decoded picture buffer 230 may be further configured to store one or more unfiltered reconstructed blocks 215, or in general unfiltered reconstructed samples, for example, if the reconstructed block 215 is not filtered by the loop filter unit 220, or any other further processed version of the reconstructed blocks or samples.

Mode Selection (Partitioning and Prediction)

The mode selection unit 260 includes the partitioning unit 262, the inter prediction unit 244, and the intra prediction unit 254, and is configured to receive or obtain raw picture data, for example, the original block 203 (the current block 203 of the current picture 17), and reconstructed picture data, for example, filtered and/or unfiltered reconstructed samples or blocks of the same (current) picture and/or from one or a plurality of previously decoded pictures, for example, from the decoded picture buffer 230 or other buffers (for example, a line buffer). The reconstructed picture data is used as reference picture data for prediction, for example, inter prediction or intra prediction, to obtain the prediction block 265 or predictor 265.

The mode selection unit 260 may be configured to determine or select partitioning for a current block (including non-partitioning) and a prediction mode (for example, an intra or inter prediction mode) and generate a corresponding prediction block 265, which is used for calculation of the residual block 205 and for the reconstruction of the reconstructed block 215.

In an embodiment, the mode selection unit 260 may be configured to select the partitioning and the prediction mode (for example, from those supported by or available for the mode selection unit 260). The prediction mode provides an optimal match or a minimum residual (the minimum residual means better compression for transmission or storage), provides minimum signaling overheads (the minimum signaling overheads mean better compression for transmission or storage), or considers or balances both. The mode selection unit 260 may be configured to determine the partitioning and the prediction mode based on bit rate distortion optimization (rate distortion optimization, RDO), for example, select a prediction mode that provides minimum bit rate distortion optimization. The terms "best", "lowest", "optimal" and the like in this specification do not necessarily mean "best", "lowest", "optimal" in general, but may also mean situations in which termination or selection criteria are met. For example, values that exceed or fall below a threshold or other restrictions may result in a "suboptimal selection" but reduce complexity and processing time.

In other words, the partitioning unit 262 may be configured to partition a picture from a video sequence into a sequence of coding tree units (CTUs), and the CTU 203 may be further partitioned into smaller block partitions or sub-blocks (which form the blocks again), for example, iteratively using quad-tree partitioning (QT), binary-tree partitioning (BT) or triple-tree partitioning (TT) or any combination thereof, and to perform, for example, prediction for each of the block partitions or sub-blocks, where the mode selection includes selection of a tree structure of the partitioned block 203 and prediction modes applied to each of the block partitions or sub-blocks.

The following describes in detail partitioning (for example, by the partitioning unit 262) and prediction (for example, by the inter prediction unit 244 and the intra prediction unit 254) that are performed by the video encoder 20.

Partitioning

The partitioning unit 262 may partition (or split) a picture block (or a CTU) 203 into smaller partitions, for example, square or rectangular smaller blocks. For a picture that has three sample arrays, a CTU includes an N×N block of luminance samples together with two corresponding blocks of chrominance samples. A maximum allowed size of the luminance block in the CTU is specified to be 128×128 in the developing versatile video coding (versatile video coding, VVC) standard, but it may be specified to be a value rather than 128×128 in the future, for example, 256×256. The CTUs of a picture may be clustered/grouped as slices/tile groups, tiles or bricks. A tile covers a rectangular area of a picture, and a tile may be divided into one or more bricks. A brick includes a plurality of CTU rows in a tile. A tile that is not partitioned into a plurality of bricks can be referred to as a brick. However, a brick is a true subset of a tile and is not referred to as a tile. Two modes of tile groups are supported in the VVC: a raster-scan slice/tile group mode and a rectangular slice mode. In the raster-scan tile group mode, a slice/tile group includes a sequence of tiles in tile raster scan of a picture. In the rectangular slice mode, a slice includes a plurality of bricks of a picture that collectively form a rectangular area of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, where a root block, for example, at a root tree-level 0 (a hierarchy-level 0 or a depth 0), may be recursively partitioned, for example, partitioned into two or more blocks of a next lower tree-level, for example, nodes at a tree-level 1 (a hierarchy-level 1 or a depth 1). These blocks may be again partitioned into two or more blocks of a next lower level, for example, a tree-level 2 (a hierarchy-level 2 or a depth 2), until partitioning is terminated (because a termination criterion is fulfilled, for example, a maximum tree depth or minimum block size is reached). Blocks which are not further partitioned are also referred to as leaf-blocks or leaf nodes of the tree. A tree using partitioning into two partitions is referred to as a binary-tree (binary-tree, BT), a tree using partitioning into three partitions is referred to as a ternary-tree (ternary-tree, TT), and a tree using partitioning into four partitions is referred to as a quad-tree (quad-tree, QT).

For example, a coding tree unit (CTU) may be or include a CTB of luminance samples, two corresponding CTBs of chrominance samples of a picture that has three sample arrays, or a CTB of samples of a monochrome picture or a picture that is coded by using three separate color planes and syntax structures (used to code the samples). Correspondingly, a coding tree block (CTB) may be an $N \times N$ block of samples for some values of N such that the division of a component into CTBs is partitioning. A coding unit (CU) may be or include a coding block of luminance samples, two corresponding coding blocks of chrominance samples of a picture that has three sample arrays, or a coding block of samples of a monochrome picture or a picture that is coded by using three separate color planes and syntax structures (used to code the samples). Correspondingly, a coding block (CB) may be an $M \times N$ block of samples for some values of M and N such that the division of a CTB into coding blocks is partitioning.

In embodiments, for example, according to the HEVC, a coding tree unit (CTU) may be split into a plurality of CUs by using a quad-tree structure denoted as a coding tree. Decision whether to code a picture area using inter (temporal) prediction or intra (spatial) prediction is made at a leaf CU level. Each leaf CU may be further split into one, two or four PUs based on the PU splitting type. Inside one PU, a same prediction process is applied and relevant information is transmitted to the decoder on a PU basis. After obtaining the residual block by applying the prediction process based on the PU splitting type, a leaf CU can be partitioned into transform units (TUs) based on another quad-tree structure similar to a coding tree for the CU.

In embodiments, for example, according to the latest video coding standard (referred to as versatile video coding (VVC)) currently in development, a combined quad-tree nested multi-type tree (for example, a binary tree and a ternary tree) splits a segmentation structure used to partition a coding tree unit. In a coding tree structure within a coding tree unit, a CU can have either a square or rectangular shape. For example, the coding tree unit (CTU) is first partitioned by a quad-tree structure. Then the quad-tree leaf nodes can be further partitioned by a multi-type tree structure. There are four splitting types in the multi-type tree structure, vertical binary-tree splitting (SPLIT_BT_VER), horizontal binary-tree splitting (SPLIT_BT_HOR), vertical ternary-tree splitting (SPLIT_TT_VER), and horizontal ternary-tree splitting (SPLIT_TT_HOR). The multi-type tree leaf nodes are referred to as coding units (CUs), and unless the CU is excessively large for a maximum transform length, this segmentation is used for prediction and transform processing without any further partitioning. This means that, in most cases, the CU, the PU and the TU have the same block size in the quad-tree with a nested multi-type tree coding block structure. An exception occurs when a maximum supported transform length is less than a width or height of a color component of the CU. The VVC develops a unique signaling mechanism of partitioning splitting information in the quad-tree with the nested multi-type tree coding structure. In the signaling mechanism, a coding tree unit (CTU) is treated as the root of a quad-tree and is first partitioned by a quad-tree structure. Each quad-tree leaf node (when sufficiently large to allow it) is then further partitioned by a multi-type tree structure. In the multi-type tree structure, a first flag (mtt_split_cu_flag) is signalled to indicate whether a node is further partitioned; when the node is further partitioned, a second flag (mtt_split_cu_vertical_flag) is signalled to indicate a splitting direction, and then a third flag (mtt_split_cu_binary_flag) is signalled to indicate whether the splitting is binary-tree splitting or ternary-tree splitting. Based on values of mtt_split_cu_vertical_flag and mtt_split_cu_binary_flag, a multi-type tree slitting mode (MttSplitMode) of a CU can be derived by the decoder based on a predefined rule or a table. It should be noted, for a specific design, for example, a $64 \times 64$ luma block and $32 \times 32$ chroma pipelining design in VVC hardware decoders, TT splitting is forbidden when either a width or height of a luminance coding block is greater than 64. TT splitting is also forbidden when either width or height of a chrominance coding block is greater than 32. The pipelining design divides a picture into virtual pipeline data units (VPDUs) which are defined as non-overlapping units in the picture. In hardware decoders, successive VPDUs are processed by a plurality of pipeline stages simultaneously. A VPDU size is roughly proportional to a buffer size in most pipeline stages, so it is important to keep the VPDU size small. In most hardware decoders, the VPDU size can be set to a maximum transform block (TB) size. However, in VVC, ternary-tree (TT) and binary-tree (BT) partitioning may lead to an increase in the VPDU size.

In addition, it should be noted that, when a portion of a tree node block exceeds the bottom or a right picture boundary, the tree node block is forced to be split until the all samples of every coded CU are located inside the picture boundaries.

For example, an intra sub-partition (ISP) tool may divide luma intra-predicted blocks vertically or horizontally into 2 or 4 sub-partitions depending on a block size.

In an example, the mode selection unit 260 of the video encoder 20 may be configured to perform any combination of the partitioning techniques described above.

As described above, the video encoder 20 is configured to determine or select a best or optimum prediction mode from a (pre-determined) prediction mode set. The prediction mode set may include, for example, an intra prediction mode and/or an inter prediction mode.

Intra Prediction

An intra prediction mode set may include 35 different intra prediction modes, for example, non-directional modes such as a DC (or average) mode and a planar mode, or directional modes such as those defined in HEVC, or may include 67 different intra prediction modes, for example, non-directional modes such as a DC (or average) mode and a planar mode, or directional modes such as those defined in VVC. For example, several conventional angular intra prediction modes are adaptively replaced with wide-angle intra prediction modes for non-square blocks as defined in VVC. As another example, to avoid division operations for DC prediction, only a longer side is used to compute an average for non-square blocks. In addition, results of intra prediction of the planar mode may be further modified by using a position dependent intra prediction combination (position dependent intra prediction combination, PDPC) method.

The intra prediction unit 254 is configured to use reconstructed samples of neighboring blocks of a same current picture to generate an intra prediction block 265 based on an intra prediction mode in the intra prediction mode set.

The intra prediction unit 254 (or in general the mode selection unit 260) is further configured to output intra prediction parameters (or in general information indicative of the selected intra prediction mode for the block) to the entropy encoding unit 270 in a form of syntax elements 266 for inclusion into the encoded picture data 21, so that, for example, the video decoder 30 may receive and use the prediction parameters for decoding.

Intra prediction modes in HEVC include a direct current prediction mode, a planar prediction mode, and 33 angle prediction modes. That is, there are 35 candidate prediction modes in total. A current block may use pixels of reconstructed picture blocks on left and upper sides as references to perform intra prediction. A picture block that is in a surrounding area of the current block and that is used to perform intra prediction on the current block becomes a reference block, and a pixel in the reference block is referred to as a reference pixel. In the 35 candidate prediction modes, the direct current prediction mode is applicable to an area whose texture is flat in the current block, and all pixels in the area use an average value of reference pixels in the reference block as prediction. The planar prediction mode is applicable to a picture block whose texture changes smoothly. For the current block that meets the condition, bilinear interpolation is performed by using a reference pixel in a reference block as prediction of all pixels in the current block. In the angle prediction mode, a value of a reference pixel in a corresponding reference block is copied along an angle as prediction of all pixels in the current block by using a feature that texture of the current block is highly correlated with texture of a neighboring reconstructed picture block.

An HEVC encoder selects an optimal intra prediction mode from the 35 candidate prediction modes for the current block, and writes the optimal intra prediction mode into a video bitstream. To improve coding efficiency of intra prediction, the encoder/decoder derives three most probable modes from respective optimal intra prediction modes of reconstructed picture blocks that use intra prediction in the surrounding area. If the optimal intra prediction mode selected for the current block is one of the three most probable modes, a first index is encoded to indicate that the selected optimal intra prediction mode is one of the three most probable modes. If the selected optimal intra prediction mode is not one of the three most probable modes, a second index is encoded to indicate that the selected optimal intra prediction mode is one of the other 32 modes (modes other than the foregoing three most probable modes in the 35 candidate prediction modes). The HEVC standard uses a 5-bit fixed-length code as the foregoing second index.

A method for deriving the three most probable modes by the HEVC encoder includes: selecting optimal intra prediction modes of the left neighboring picture block and the upper neighboring picture block of the current block, and putting the optimal intra prediction modes into a set. If the two optimal intra prediction modes are the same, only one intra prediction mode in the set is reserved. If the two optimal intra prediction modes are the same and both are angle prediction modes, two angle prediction modes adjacent to an angle direction are further selected and added to the set. Otherwise, the planar prediction mode, the direct current mode, and a vertical prediction mode are sequentially selected and added to the set until a quantity of modes in the set reaches 3.

After performing entropy decoding on the bitstream, the HEVC decoder obtains mode information of the current block. The mode information includes an identifier indicating whether the optimal intra prediction mode of the current block is in the three most probable modes, an index of the optimal intra prediction mode of the current block in the three most possible modes, or an index of the optimal intra prediction mode of the current block in the other 32 modes.

Inter Prediction

In a possible implementation, an inter prediction mode set depends on available reference pictures (that is, previous at least partially decoded pictures, for example, stored in the DBP 230) and other inter prediction parameters, for example, whether the entire reference picture or only a part, for example, a search window area around the area of the current block, of the reference picture is used for searching for a best matching reference block, and/or for example, whether pixel interpolation is applied, for example, half-pixel, quarter-pixel and/or 1/16-pixel interpolation, or not.

In addition to the foregoing prediction modes, a skip mode and/or a direct mode may further be applied.

For example, a merge candidate list of an extended merge prediction mode includes the following five types of candidates in order: spatial MVP from spatial neighboring CUs, temporal MVP from collocated CUs, history-based MVP from an FIFO table, pairwise average MVP, and zero MVs. Bilateral matching-based decoder side motion vector refinement (DMVR) may be used to increase accuracy of the MVs of the merge mode. A merge mode with an MVD (MMVD) comes from a merge mode with motion vector differences. An MMVD flag is sent right after a skip flag and a merge flag are sent, to specify whether the MMVD mode is used for a CU. A CU-level adaptive motion vector resolution (AMVR) scheme may be used. AMVR allows the MVD of the CU to be coded in different precision. An MVD of a current CU may be adaptively selected based on a prediction mode of the current CU. When a CU is coded in the merge mode, a combined inter/intra prediction (CIIP) mode may be applied to the current CU. Weighted averaging of inter and intra prediction signals is performed to obtain CIIP prediction. For affine motion compensation prediction, an affine motion field of a block is described based on motion information of two control point (4-parameter) motion vectors or three control point (6-parameter) motion vectors. Sub-block-based temporal motion vector prediction (SbTMVP) is similar to temporal motion vector prediction (TMVP) in HEVC, but predicts a motion vector of a sub-CU in the current CU. A bi-directional optical flow (BDOF), previously referred to as a BIO, is a simpler version that requires much less computation, especially in terms of a quantity of multiplications and a value of a multiplier. In a triangle partition mode, a CU is split evenly into two triangular portions through diagonal splitting and anti-diagonal splitting. In addition, a bi-prediction mode is extended beyond simple averaging to allow weighted averaging of two prediction signals.

The inter prediction unit 244 may include a motion estimation (ME) unit and a motion compensation (MC) unit. The motion estimation unit may be configured to receive or obtain the picture block 203 (the current picture block 203 of the current picture 17) and a decoded picture 231, or at least one or more previously reconstructed blocks, for example, reconstructed blocks of one or more other/different previously decoded pictures 231, for motion estimation. For example, a video sequence may include the current picture and the previously decoded picture 231, or in other words, the current picture and the previously decoded picture 231 may be a part of or form a sequence of pictures forming the video sequence.

For example, the encoder 20 may be configured to select a reference block from a plurality of reference blocks of a same picture or different pictures of a plurality of other pictures and provide a reference picture (or reference picture index) and/or an offset (spatial offset) between a position (x and y coordinates) of the reference block and a position of the current block as inter prediction parameters to the motion estimation unit. This offset is also referred to as a motion vector (motion vector, MV).

The motion compensation unit is configured to obtain, for example, receive, an inter prediction parameter and perform inter prediction based on or using the inter prediction parameter to obtain an inter prediction block 246. Motion compensation performed by the motion compensation unit may include extracting or generating a prediction block based on a motion/block vector determined through motion estimation, and may further include performing interpolation on sub-pixel precision. Interpolation filtering may generate additional pixel samples from known pixel samples, thus potentially increasing a quantity of candidate prediction blocks that may be used to code a picture block. Upon receiving a motion vector corresponding to a PU of the current picture block, the motion compensation unit may locate a prediction block to which the motion vector points in one of reference picture lists.

The motion compensation unit may further generate syntax elements associated with a block and a video slice for use by the video decoder 30 in decoding the picture blocks of the video slice. In addition or as an alternative to slices and respective syntax elements, tile groups and/or tiles and respective syntax elements may be generated or used.

Figure 4:
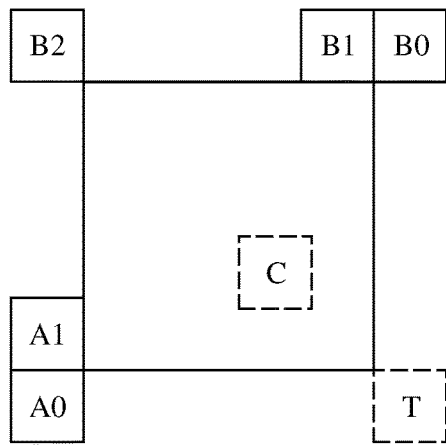
FIG. 4 is a schematic diagram of an example of candidate picture blocks according to an embodiment of this application.

In a process of obtaining a candidate motion vector list of an advanced motion vector prediction (AMVP) mode, a motion vector (MV) that can be added to the candidate motion vector list as an alternative includes an MV of a spatially neighboring picture block of the current block and an MV of a temporally neighboring picture block of the current block. The MV of the spatially neighboring picture block may include an MV of a left candidate picture block of the current block and an MV of an upper candidate picture block of the current block. For example, FIG. 4 is a schematic diagram of an example of candidate picture blocks according to an embodiment of this application. As shown in FIG. 4, a set of left candidate picture blocks includes {A0, A1}, a set of top candidate picture blocks includes {B0, B1, B2}, and a set of temporally neighboring candidate picture blocks includes {C, T}. All the three sets can be added to the candidate motion vector list as alternatives. However, according to an existing coding standard, a maximum length of the candidate motion vector list of AMVP is 2. Therefore, MVs of at most two picture blocks need to be determined from the three sets in a specified order and added to the candidate motion vector list. The order may be as follows: The set of left candidate picture blocks {A0, A1} of the current block is preferentially considered (where A0 is first considered, and A1 is then considered if A0 is unavailable); then the set of top candidate picture blocks {B0, B1, B2} of the current block is considered (where B0 is first considered, and B1 is then considered if B0 is unavailable, and B2 is finally considered if B1 is unavailable); and finally, the set of temporally neighboring candidate picture blocks {C, T} of the current block is considered (where T is first considered, and C is then considered if T is unavailable).

After the candidate motion vector list is obtained, an optimal MV is determined from the candidate motion vector list based on rate distortion cost (rate distortion cost, RD cost), and a candidate motion vector with minimum RD cost is used as a motion vector predictor (motion vector predictor, MVP) of the current block. The rate distortion cost is calculated according to the following formula:

$$J = SAD + \lambda R$$

J represents the RD cost, SAD is a sum of absolute differences (SAD), obtained through motion estimation based on the candidate motion vector, between a pixel value of a prediction block and a pixel value of the current block, R represents a bit rate, and k represents a Lagrange multiplier.

The encoder side transfers an index of the determined MVP in the candidate motion vector list to the decoder side. Further, motion search is performed in an MVP-centered neighboring domain, to obtain an actual motion vector of the current block. The encoder side calculates a motion vector difference (MVD) between the MVP and the actual motion vector, and transfers the MVD to the decoder side. The decoder side parses an index, finds a corresponding MVP in the candidate motion vector list based on the index, parses the MVD, and adds the MVD and the MVP to obtain the actual motion vector of the current block.

In a process of obtaining a candidate motion information list in a merge mode, motion information that can be added to the candidate motion information list as an alternative includes motion information of the spatially neighboring picture block or temporally neighboring picture block of the current block. The spatially neighboring picture block and the temporally neighboring picture block may be shown in FIG. 4. Candidate motion information corresponding to spatially picture blocks in the candidate motion information list comes from five spatially neighboring blocks (A0, A1, B0, B1, and B2). If the spatial neighboring block is unavailable or is in an intra frame prediction mode, motion information of the spatial neighboring block is not added to the candidate motion information list. Temporally candidate motion information of the current block is obtained after an MV of a block at a corresponding position in a reference frame is scaled based on a picture order count (POC) of the reference frame and a picture order count (POC) of a current frame. Whether a block at a position T in the reference frame is available is first determined. If not available, a block at a position C is selected. After the candidate motion information list is obtained, optimal motion information is determined as motion information of the current block from the candidate motion information list based on the RD cost. The encoder side transmits an index value (denoted as a merge index) of a position of the optimal motion information in the candidate motion information list to the decoder side.

Entropy Coding

The entropy encoding unit 270 is configured to apply an entropy encoding algorithm or scheme (for example, a variable length coding (VLC) scheme, a context-adaptive VLC (CAVLC) scheme, an arithmetic coding scheme, a binarization, a context-adaptive binary arithmetic coding (CABAC), syntax-based context-adaptive binary arithmetic coding (SBAC), probability interval partitioning entropy (PIPE) coding or another entropy encoding method or technology) to the quantized residual coefficients 209, inter prediction parameters, intra prediction parameters, loop filter parameters and/or other syntax elements to obtain encoded picture data 21 that can be output via an output end 272, for example, in a form of an encoded bitstream 21, so that the video decoder 30 and the like may receive and use the parameters for decoding. The encoded bitstream 21 may be transmitted to the video decoder 30, or stored in a memory for later transmission or retrieval by the video decoder 30.

Other structural variations of the video encoder 20 may be used to encode the video stream. For example, a non-transform-based encoder 20 may quantize a residual signal directly without the transform processing unit 206 for some blocks or frames. In another implementation, the encoder 20 may have the quantization unit 208 and the inverse quantization unit 210 combined into a single unit.

Decoder and Decoding Method

Figure 3:
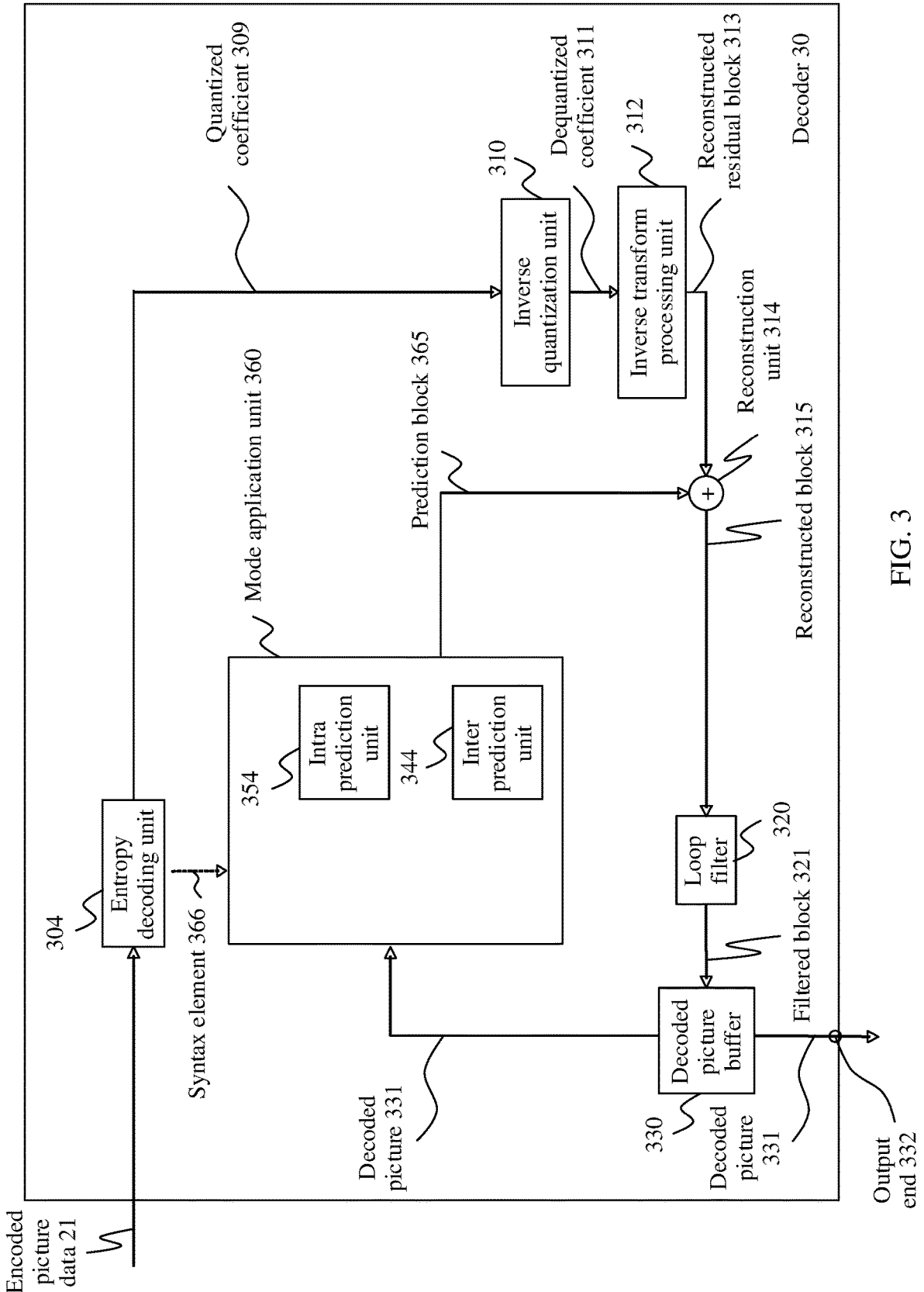
FIG. 3 is an example block diagram of a video decoder according to an embodiment of this application.

As shown in FIG. 3, the video decoder 30 is configured to receive encoded picture data 21 (for example, the encoded bitstream 21), for example, encoded by the encoder 20, to obtain a decoded picture 331. The encoded picture data or bitstream includes information for decoding the encoded picture data, for example, data that represents picture blocks of an encoded video slice (and/or tile groups or tiles), and associated syntax elements.

In the example in FIG. 3, the decoder 30 includes an entropy decoding unit 304, an inverse quantization unit 310, an inverse transform processing unit 312, a reconstruction unit 314 (for example, a summer 314), a loop filter 320, a decoded picture buffer (DBP) 330, a mode application unit 360, an inter prediction unit 344 and an intra prediction unit 354. The inter prediction unit 344 may be or include a motion compensation unit. In some examples, the video decoder 30 may perform a decoding process generally reciprocal to the encoding process described with reference to the video encoder 20 shown in FIG. 2.

As explained with regard to the encoder 20, the inverse quantization unit 210, the inverse transform processing unit 212, the reconstruction unit 214, the loop filter 220, the decoded picture buffer DPB 230, the inter prediction unit 344 and the intra prediction unit 354 also form a "built-in decoder" of the video encoder 20. Accordingly, the inverse quantization unit 310 may be identical in function to the inverse quantization unit 110, the inverse transform processing unit 312 may be identical in function to the inverse transform processing unit 122, the reconstruction unit 314 may be identical in function to the reconstruction unit 214, the loop filter 320 may be identical in function to the loop filter 220, and the decoded picture buffer 330 may be identical in function to the decoded picture buffer 230. Therefore, the explanations provided for the respective units and functions of the video encoder 20 are correspondingly applicable to the respective units and functions of the video decoder 30.

Entropy Decoding

The entropy decoding unit 304 is configured to parse the bitstream 21 (or in general encoded picture data 21) and perform, for example, entropy decoding on the encoded picture data 21 to obtain quantized coefficients 309 and/or decoded coding parameters, for example, any or all of inter prediction parameters (for example, a reference picture index and a motion vector), intra prediction parameters (for example, an intra prediction mode or an index), transform parameters, quantization parameters, loop filter parameters, and/or other syntax elements. The entropy decoding unit 304 may be configured to apply the decoding algorithm or scheme corresponding to the encoding scheme as described with regard to the entropy encoding unit 270 of the encoder 20. The entropy decoding unit 304 may be further configured to provide the inter prediction parameter, the intra prediction parameter and/or the other syntax elements to the mode application unit 360 and other parameters to other units of the decoder 30. The video decoder 30 may receive syntax elements at a video slice level and/or a video block level. In addition or as an alternative to slices and respective syntax elements, tile groups and/or tiles and respective syntax elements may be received or used.

Inverse Quantization

The inverse quantization unit 310 may be configured to receive quantization parameters (QPs) (or in general information related to the inverse quantization) and quantized coefficients from the encoded picture data 21 (for example, by parsing and/or decoding by the entropy decoding unit 304) and perform, based on the quantization parameters, an inverse quantization on the decoded quantized coefficients 309 to obtain dequantized coefficients 311, which may also be referred to as transform coefficients 311. The inverse quantization process may include use of a quantization parameter determined by the video encoder 20 for each video block in the video slice to determine a degree of quantization, and likewise, a degree of inverse quantization that should be applied.

Inverse Transform

The inverse transform processing unit 312 may be configured to receive dequantized coefficients 311, also referred to as transform coefficients 311, and apply a transform to the dequantized coefficients 311 to obtain reconstructed residual blocks 213 in a sample domain. The reconstructed residual block 213 may also be referred to as a transform block 213. The transform may be an inverse transform, for example, an inverse DCT, an inverse DST, an inverse integer transform, or a conceptually similar inverse transform process. The inverse transform processing unit 312 may be further configured to receive transform parameters or corresponding information from the encoded picture data 21 (for example, by parsing and/or decoding by the entropy decoding unit 304) to determine the transform to be applied to the dequantized coefficients 311.

Reconstruction

The reconstruction unit 314 (for example, the summer 314) is configured to add the reconstructed residual block 213 to the prediction block 365 to obtain a reconstructed block 315 in the sample domain, for example, by adding sample values of the reconstructed residual block 213 and sample values of the prediction block 365.

Filtering

The loop filter unit 320 (either in a coding loop or after the coding loop) is configured to filter the reconstructed block 315 to obtain a filtered block 321, to smooth pixel transitions or improve video quality. The loop filter unit 320 may include one or more loop filters such as a deblocking filter, a sample-adaptive offset (SAO) filter or one or more other filters, for example, an adaptive loop filter (ALF), a noise suppression filter (NSF), or any combination thereof. In an example, the loop filter unit 220 may include a deblocking filter, a SAO filter and an ALF filter. An order of a filtering process may be the deblocking filter, the SAO filter and the ALF filter. In another example, a process called luminance mapping with chrominance scaling (LMCS) (namely, an adaptive in-loop reshaper) is added. This process is performed before deblocking. In another example, a deblocking filter process may also be applied to internal sub-block edges, for example, affine sub-block edges, ATMVP sub-block edges, sub-block transform (SBT) edges, and intra sub-partition (ISP) edges. Although the loop filter unit 320 is shown in FIG. 3 as being a loop filter, in other configurations, the loop filter unit 320 may be implemented as a post loop filter.

Decoded Picture Buffer

Decoded video blocks 321 of a picture are then stored in a decoded picture buffer 330, and the decoded picture buffer 330 stores the decoded pictures 331 as reference pictures for subsequent motion compensation for other pictures and/or for output respectively display.

The decoder 30 is configured to output the decoded picture 331, for example, via an output end 332, for presentation or viewing to a user.

Prediction

The inter prediction unit 344 may be identical in function to the inter prediction unit 244 (in particular to the motion compensation unit) and the intra prediction unit 354 may be identical in function to the intra prediction unit 254, and performs splitting or partitioning decisions and prediction based on the partitioning and/or prediction parameters or respective information received from the encoded picture data 21 (for example, by parsing and/or decoding by the entropy decoding unit 304). The mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, the intra prediction unit 354 of mode application unit 360 is configured to generate prediction block 365 for a picture block of the current video slice based on a signaled intra prediction mode and data from previously decoded blocks of the current picture. When the video picture is coded as an inter coded (for example, B or P) slice, the inter prediction unit 344 (for example, the motion compensation unit) of the mode application unit 360 is configured to generate the prediction blocks 365 for a video block of the current video slice based on the motion vectors and other syntax elements received from the entropy decoding unit 304. For inter prediction, the prediction blocks may be generated from a reference picture in a reference picture list. The video decoder 30 may construct reference frame lists: a list 0 and a list 1, by using a default construction technology based on reference pictures stored in the DPB 330. The same or similar process may be applied for or by embodiments using tile groups (for example, video tile groups) and/or tiles (for example, video tiles) in addition or alternatively to slices (for example, video slices), for example, a video may be coded by using I, P or B tile groups and/or tiles.

The mode application unit 360 is configured to determine the prediction information for a video block of the current video slice by parsing the motion vectors or other syntax elements, and use the prediction information to generate the prediction block for the current video block being decoded. For example, the mode application unit 360 uses some of the received syntax elements to determine a prediction mode (for example, intra prediction or inter prediction) used to code the video blocks of the video slice, an inter prediction slice type (for example, a B slice, a P slice, or a GPB slice), construction information for one or more of the reference picture lists for the slice, motion vectors for each inter coded video block of the slice, an inter prediction status for each inter coded video block of the slice, and other information to decode the video blocks in the current video slice. The same or similar process may be applied for or by embodiments using tile groups (for example, video tile groups) and/or tiles (for example, video tiles) in addition or alternatively to slices (for example, video slices), for example, a video may be coded by using I, P or B tile groups and/or tiles.

In an embodiment, the video decoder 30 in FIG. 3 may be further configured to partition and/or decode a picture by using slices (also referred to as video slices), where the picture may be partitioned or decoded by using one or more slices (typically non-overlapping). Each slice may include one or more blocks (for example, CTUs) or one or more groups of blocks (for example, tiles in the H.265/HEVC/VVC standard and bricks in the VVC standard).

In an embodiment, the video decoder 30 shown in FIG. 3 may be further configured to partition and/or decode the picture by using slices/tile groups (also referred to as video tile groups) and/or tiles (also referred to as video tiles). The picture may be partitioned or decoded by using one or more slices/tile groups (typically non-overlapping), and each slice/tile group may include one or more blocks (for example, CTUs) or one or more tiles. Each tile may be of a rectangular shape and may include one or more blocks (for example, CTUs), for example, complete or fractional blocks.

Other variations of the video decoder 30 can be used to decode the encoded picture data 21. For example, the decoder 30 can generate an output video stream without the loop filter unit 320. For example, a non-transform-based decoder 30 may inversely quantize the residual signal directly without the inverse transform processing unit 312 for some blocks or frames. In another implementation, the video decoder 30 may have the inverse quantization unit 310 and the inverse transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as clip (clip) or shift (shift), may be performed on the processing result of the interpolation filtering, motion vector derivation or loop filtering.

It should be noted that further operations may be applied to the derived motion vectors of a current block (including but not limit to control point motion vectors in an affine mode, sub-block motion vectors in affine, planar, and ATMVP modes, temporal motion vectors, and so on). For example, the value of the motion vector is constrained to a predefined range based on a representation bit of the motion vector. If the representation bit of the motion vector is bitDepth, the range is from $-2^{(bitDepth-1)}$ to $2^{(bitDepth-1)}-1$, where the "^" represents exponentiation. For example, if bitDepth is set to 16, the range is from −32768 to 32767, or if bitDepth is set to 18, the range is from −131072 to 131071. For example, the value of the derived motion vector (for example, the MVs of four 4×4 sub-blocks in one 8×8 block) is constrained such that a max difference between integer parts of the MVs of the four 4×4 sub-blocks does not exceed N pixels, for example, does not exceed one pixel.

Two methods for constraining the motion vector based on the bitDepth are provided herein.

Although embodiments have been primarily described based on video coding, it should be noted that embodiments of the coding system 10, the encoder 20 and the decoder 30 and the other embodiments described in this specification may also be configured for still picture processing or coding, that is, the processing or coding of an individual picture independent of any preceding or consecutive picture in video coding. In general, only inter prediction units 244 (encoder) and 344 (decoder) may not be available in case the picture processing is limited to a single picture 17. All other functions (also referred to as tools or technologies) of the video encoder 20 and video decoder 30 may equally be used for still picture processing, for example, residual calculation 204/304, transform 206, quantization 208, inverse quantization 210/310, (inverse) transform 212/312, partitioning 262/362, intra prediction 254/354, and/or loop filtering 220/320, and entropy encoding 270 and entropy decoding 304.

FIG. 5 is an example block diagram of a video coding device 500 according to an embodiment of this application. The video coding device 500 is suitable for implementing the disclosed embodiments as described in this specification. In an embodiment, the video coding device 500 may be a decoder such as the video decoder 30 in FIG. 1a or an encoder such as the video encoder 20 in FIG. 1a.

The video coding device 500 includes ingress ports 510 (or input ports 510) and a receiver unit (Rx) 520 for receiving data; a processor, a logic unit, or a central processing unit (CPU) 530 for processing the data, for example, the processor 530 herein may be a neural network processing unit 530; a transmitter unit (Tx) 540 and egress ports 550 (or output ports 550) for transmitting the data; and a memory 560 for storing the data. The video coding device 500 may also include optical-to-electrical (OE) components and electrical-to-optical (EO) components coupled to the ingress ports 510, the receiver unit 520, the transmitter unit 540, and the egress ports 550 for egress or ingress of optical or electrical signals.

The processor 530 is implemented by hardware and software. The processor 530 may be implemented as one or more processor chips, cores (for example, a multi-core processor), FPGAs, ASICs, and DSPs. The processor 530 communicates with the ingress ports 510, the receiver unit 520, the transmitter unit 540, the egress ports 550, and the memory 560. The processor 530 includes a coding module 570 (for example, a neural network-based coding module 570). The coding module 570 implements the disclosed embodiments described above. For example, the coding module 570 implements, processes, prepares, or provides various coding operations. Therefore, the coding module 570 provides a substantial improvement to functions of the video coding device 500 and affects switching of the video coding device 500 to a different state. Alternatively, the coding module 570 is implemented as instructions stored in the memory 560 and executed by the processor 530.

The memory 560 may include one or more disks, tape drives, and solid-state drives and may be used as an overflow data storage device, to store programs when such programs are selected for execution, and to store instructions and data that are read during program execution. The memory 560 may be volatile and/or non-volatile and may be a read-only memory (ROM), a random access memory (RAM), a ternary content-addressable memory (TCAM), and/or a static random-access memory (SRAM).

Figure 6:
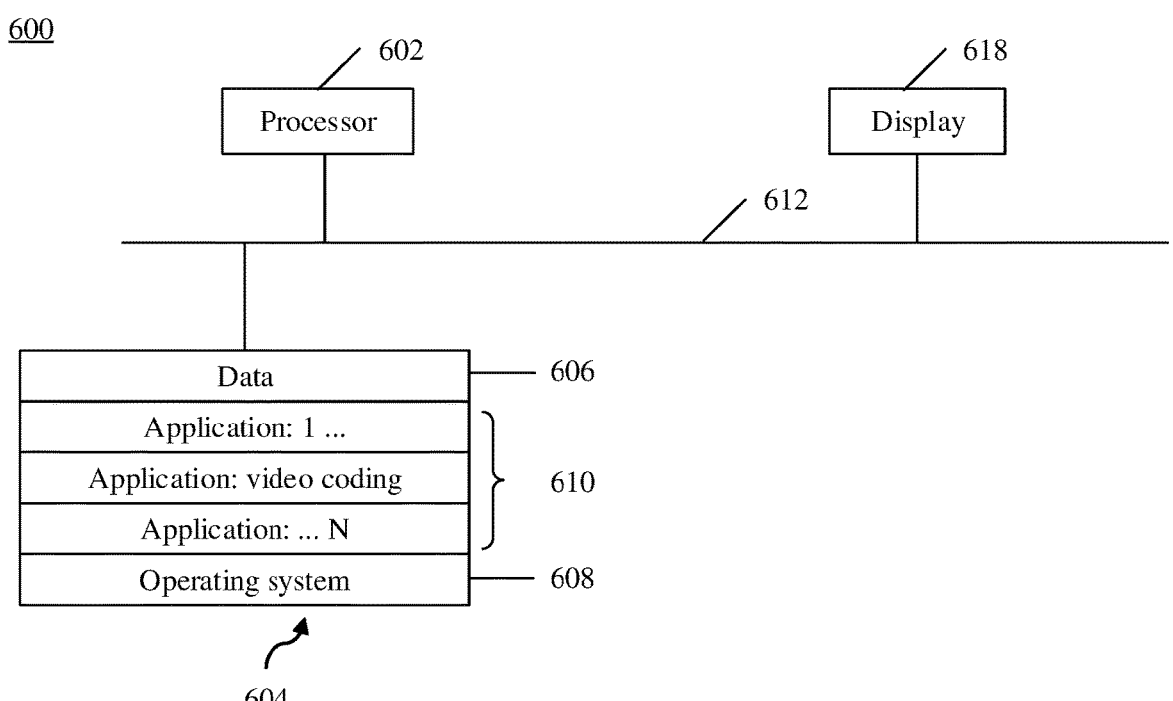
FIG. 6 is an example block diagram of an apparatus according to an embodiment of this application.

FIG. 6 is an example block diagram of an apparatus 600 according to an embodiment of this application. The apparatus 600 may be used as either or both of the source device 12 and the destination device 14 in FIG. 1a.

A processor 602 in the apparatus 600 can be a central processing unit. Alternatively, the processor 602 can be any other type of device, or a plurality of devices, capable of manipulating or processing information now-existing or hereafter developed. Although the disclosed implementations can be implemented by using a single processor such as the processor 602 shown in the figure, advantages in speed and efficiency can be achieved by using more than one processor.

A memory 604 in the apparatus 600 can be a read-only memory (ROM) device or a random access memory (RAM) device in an implementation. Any other appropriate type of storage device can be used as the memory 604. The memory 604 may include code and data 606 that are accessed by the processor 602 through a bus 612. The memory 604 may further include an operating system 608 and an application 610. The application 610 includes at least one program that permits the processor 602 to perform the method described in this specification. For example, the application 610 may include applications 1 to N, and further include a video coding application that performs the method described in this specification.

The apparatus 600 may further include one or more output devices, such as a display 618. The display 618 may be, in one example, a touch sensitive display that combines a display with a touch sensitive element that is operable to sense touch inputs. The display 618 may be coupled to the processor 602 through the bus 612.

Although depicted as a single bus in this specification, the bus 612 of the apparatus 600 may include a plurality of buses. Further, a secondary storage may be directly coupled to another component of the apparatus 600 or may be accessed via a network and may include a single integrated unit such as a memory card or a plurality of units such as a plurality of memory cards. The apparatus 600 can thus be implemented in a wide variety of configurations.

Embodiments of this application relate to application of a neural network. For ease of understanding, the following first explains some nouns or terms used in embodiments of this application. The nouns or terms are also used as a part of content of the present invention.

(1) Neural Network

The neural network (NN) is a machine learning model. The neural network may include neurons. The neuron may be an operation unit that uses $x_s$ and an intercept of 1 as inputs, where an output of the operation unit may be as follows:

$$h_{W,b}(x) = f(W^T x) = f\left(\sum\nolimits_{s=1}^{n} W_s x_s + b\right) \qquad (1-1)$$

s=1, 2, . . . , or n, n is a natural number greater than 1, $W_s$ is a weight of $x_s$, and b is a bias of the neuron. f is an activation function of the neuron, and is used to introduce a non-linear feature into the neural network to convert an input signal in the neuron into an output signal. The output signal of the activation function may be used as an input of a next convolutional layer. The activation function may be a sigmoid function. The neural network is a network formed by connecting a plurality of single neurons together. To be specific, an output of a neuron may be an input of another neuron. An input of each neuron may be connected to a local receptive field of a previous layer to extract a feature of the local receptive field. The local receptive field may be an area including several neurons.

(2) Deep Neural Network

The deep neural network (DNN) is also referred to as a multi-layer neural network, and may be understood as a neural network having a plurality of hidden layers. There is no special measurement standard for "a plurality of" herein. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is definitely connected to any neuron at an $(i+1)^{th}$ layer. Although the DNN seems complex, it is not complex in terms of work at each layer. Simply speaking, the DNN is shown in the following linear relationship expression: $\vec{y}=\alpha(W\vec{x}+\vec{b})$, where $\vec{x}$ is an input vector, $\vec{y}$ is an output vector, $\vec{b}$ is a bias vector, W is a weight matrix (also referred to as a coefficient), and $\alpha(\ )$ is an activation function. At each layer, only such a simple operation is performed on the input vector $\vec{x}$ to obtain the output vector $\vec{y}$. Because the DNN includes a large quantity of layers, there are a large quantity of coefficients W and a large quantity of offset vectors $\vec{b}$. Definitions of these parameters in the DNN are as follows: The coefficient W is used as an example. It is assumed that in a three-layer DNN, a linear coefficient from a fourth neuron at a second layer to a second neuron at a third layer is defined as $$w_{24}^3.$$

The superscript 3 represents the layer at which the coefficient W is located, and the subscript corresponds to the output third-layer index 2 and the input second-layer index 4. In conclusion, a coefficient from the $k^{th}$ neuron at the $(L-1)^{th}$ layer to the $j^{th}$ neuron at the $L^{th}$ layer is defined as $$W_{jk}^L.$$

It should be noted that there is no parameter W at the input layer. In the deep neural network, more hidden layers make the network more capable of describing a complex case in the real world. Theoretically, a model with more parameters has higher complexity and a larger "capacity", which means that the model can complete a more complex learning task. Training the deep neural network is a process of learning a weight matrix, and a final objective of the training is to obtain a weight matrix of all layers of the trained deep neural network (a weight matrix formed by vectors W at a plurality of layers).

(3) Convolutional Neural Network

The convolutional neural network (CNN) is a deep neural network with a convolutional structure, and a deep learning architecture. In the deep learning architecture, multi-layer learning is performed at different abstract levels according to a machine learning algorithm. As a deep learning architecture, the CNN is a feed-forward artificial neural network. Each neuron in the feed-forward artificial neural network may respond to a picture input into the neural network. The convolutional neural network includes a feature extractor including a convolutional layer and a pooling layer. The feature extractor may be considered as a filter. A convolution process may be considered as using a trainable filter to perform convolution on an input picture or a convolutional feature map.

The convolutional layer is a neuron layer that is in the convolutional neural network and at which convolution processing is performed on an input signal. The convolutional layer may include a plurality of convolution operators. The convolution operator is also referred to as a kernel. In picture processing, the convolution operator functions as a filter that extracts specific information from an input picture matrix. The convolution operator may essentially be a weight matrix, and the weight matrix is usually predefined. In a process of performing a convolution operation on a picture, the weight matrix is usually used to process pixels at a granularity of one pixel (or two pixels, depending on a value of a stride) in a horizontal direction on the input picture, to extract a specific feature from the picture. A size of the weight matrix should be related to a size of the picture. It should be noted that a depth dimension of the weight matrix is the same as a depth dimension of the input picture. During a convolution operation, the weight matrix extends to an entire depth of the input picture. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional picture. The dimension herein may be understood as being determined based on the foregoing "plurality". Different weight matrices may be used to extract different features from the picture. For example, one weight matrix is used to extract edge information of the picture, another weight matrix is used to extract a specific color of the picture, and a still another weight matrix is used to blur unneeded noise in the picture. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation. Weight values in these weight matrices need to be obtained through massive training in actual application. Each weight matrix including weight values obtained through training may be used to extract information from the input picture, so that the convolutional neural network performs correct prediction. When the convolutional neural network has a plurality of convolutional layers, a large quantity of general features are usually extracted at an initial convolutional layer. The general feature may also be referred to as a low-level feature. As a depth of the convolutional neural network increases, a feature extracted at a subsequent convolutional layer is more complex, for example, a high-level semantic feature. A feature with higher-level semantics is more applicable to a to-be-resolved problem.

Because a quantity of training parameters usually needs to be reduced, the pooling layer usually needs to be periodically introduced after a convolutional layer. One convolutional layer may be followed by one pooling layer, or a plurality of convolutional layers may be followed by one or more pooling layers. During picture processing, the pooling layer is only used to reduce a space size of the picture. The pooling layer may include an average pooling operator and/or a maximum pooling operator, to perform sampling on the input picture to obtain a picture with a small size. The average pooling operator may be used to calculate pixel values in the picture in a specific range, to generate an average value. The average value is used a result of average pooling. The maximum pooling operator may be used to select a pixel with a maximum value within a specific range as a maximum pooling result. In addition, similar to that the size of the weight matrix at the convolutional layer needs to be related to the size of the picture, an operator at the pooling layer also needs to be related to the size of the picture. A size of a processed picture output from the pooling layer may be less than a size of a picture input into the pooling layer. Each pixel in the picture output from the pooling layer represents an average value or a maximum value of a corresponding sub-area of the picture input into the pooling layer.

After processing performed at the convolutional layer/ pooling layer, the convolutional neural network still cannot output required output information. As described above, the convolutional layer/pooling layer only extracts a feature and reduces parameters brought by an input picture. However, to generate final output information (required class information or other related information), the convolutional neural network needs to use the neural network layer to generate an output of one required class or outputs of a group of required classes. Therefore, the neural network layer may include a plurality of hidden layers. Parameters included in the plurality of hidden layers may be obtained through pre-training based on related training data of a specific task type. For example, the task type may include picture recognition, picture classification, and super-resolution picture reconstruction.

Optionally, at the neural network layer, the plurality of hidden layers are followed by the output layer of the entire convolutional neural network. The output layer has a loss function similar to a categorical cross entropy, and the loss function is specifically used to calculate a prediction error. Once forward propagation of the entire convolutional neural network is completed, back propagation is started to update a weight value and a deviation of each layer mentioned above, to reduce a loss of the convolutional neural network and an error between a result output by the convolutional neural network by using the output layer and an ideal result.

(4) Recurrent Neural Network

The recurrent neural network (RNN) is used to process sequence data. A conventional neural network model starts from an input layer to a hidden layer and then to an output layer, and the layers are fully connected, and nodes at each layer are not connected. Although this ordinary neural network resolves a plurality of problems, it is still incompetent to a plurality of problems. For example, if a word in a sentence is to be predicted, a previous word usually needs to be used, because adjacent words in the sentence are related. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training of the RNN is the same as training of the conventional CNN or DNN. An error back propagation algorithm is also used, but there is a difference: If the RNN is expanded, a parameter such as W of the RNN is shared. This is different from the conventional neural network described in the foregoing example. In addition, during use of a gradient descent algorithm, an output in each step depends not only on a network in a current step, but also on a network status in several previous steps. The learning algorithm is referred to as a back propagation through time (BPTT) algorithm.

Why is the recurrent neural network still required when the convolutional neural network is available? A reason is simple. In the convolutional neural network, there is a premise that elements are independent of each other, and an input and an output are also independent, such as a cat and a dog. However, in the real world, a plurality of elements are interconnected. For example, the stock changes with time. For another example, a person says "I like traveling, and the most favorite place is Yunnan. In the future, when there is a chance, I will go to (_). Herein, people should know that the person will go to "Yunnan". Because people perform inference from the context. However, how do machines do that? Then, the RNN emerges. The RNN is intended to make the machine capable of memorizing like a human. Therefore, an output of the RNN needs to depend on current input information and historical memorized information.

(5) Loss Function

In a process of training a deep neural network, because it is expected that an output of the deep neural network is as close as possible to a predictor that is actually expected, a current predictor of the network may be compared with a target value that is actually expected, and then a weight vector at each layer of the neural network is updated based on a difference between the predicted value and the target value (certainly, there is usually an initialization process before the first updating, to be specific, a parameter is preconfigured for each layer of the deep neural network). For example, if the predictor of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predictor and the target value" needs to be predefined. This is a loss function or an objective function. The loss function and the objective function are important equations used to measure the difference between the predictor and the target value. The loss function is used as an example. A larger output value (loss) of the loss function indicates a larger difference. Therefore, training of the deep neural network is a process of minimizing the loss as much as possible.

(6) Back Propagation Algorithm

A convolutional neural network may correct a value of a parameter in an initial super-resolution model in a training process according to an error back propagation (BP) algorithm, so that a reconstruction error loss of the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain an optimal parameter, for example, a weight matrix, of the super-resolution model.

(7) Generative Adversarial Network

The generative adversarial network (GAN) is a deep learning model. The model includes at least two modules: One module is a generative model, and the other module is a discriminative model. The two modules are used to learn through gaming with each other, to generate a better output.

Both the generative model and the discriminative model may be neural networks, and may be specifically deep neural networks or convolutional neural networks. A basic principle of the GAN is as follows: A GAN for generating a picture is used as an example. It is assumed that there are two networks: G (Generator) and D (Discriminator). G is a network for generating a picture. G receives random noise z, and generates the picture based on the noise, where the picture is denoted as G(z). D is a discriminator network used to determine whether a picture is "real". An input parameter of D is x, x represents a picture, and an output D(x) represents a probability that x is a real picture. If a value of D(x) is 1, it indicates that the picture is 100% real. If the value of D(x) is 0, it indicates that the picture cannot be real. In a process of training the generative adversarial network, an objective of the generative network G is to generate a picture that is as real as possible to deceive the discriminative network D, and an objective of the discriminative network D is to distinguish between the picture generated by G and a real picture as much as possible. In this way, a dynamic "gaming" process, to be specific, "adversary" in the "generative adversarial network", exists between G and D. A final gaming result is that in an ideal state, G may generate a picture G(z) that is to be difficultly distinguished from a real picture, and it is difficult for D to determine whether the picture generated by G is real, to be specific, D(G(z))=0.5. In this way, an excellent generative model G is obtained, and can be used to generate a picture.

Figure 7A:
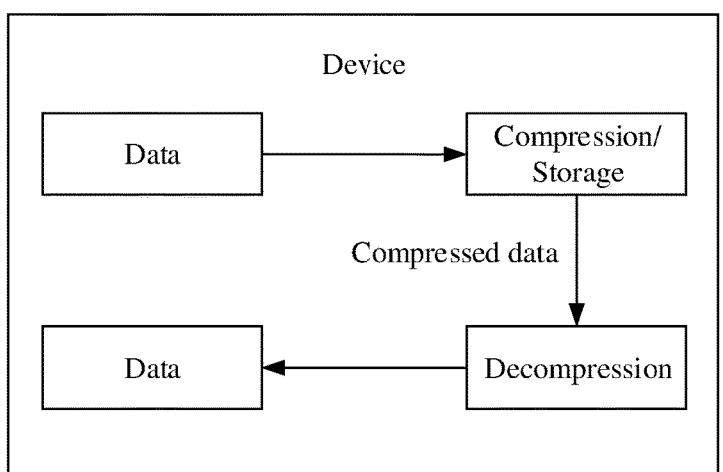
FIG. 7a is a schematic diagram of an application scenario according to an embodiment of this application.

FIG. 7a is a schematic diagram of an application scenario according to an embodiment of this application. As shown in FIG. 7a, in the application scenario, a device obtains data, compresses the obtained data, and then stores compressed data. The device may integrate functions of the foregoing source device and destination device.

1. The device obtains the data.
2. The device compresses the data to obtain the compressed data.
3. The device stores the compressed data.

It should be understood that the device compresses the data to save storage space. Optionally, the device may store the compressed data in an album or a cloud album.

4. The device decompresses the compressed data to obtain data.

Figure 7B:
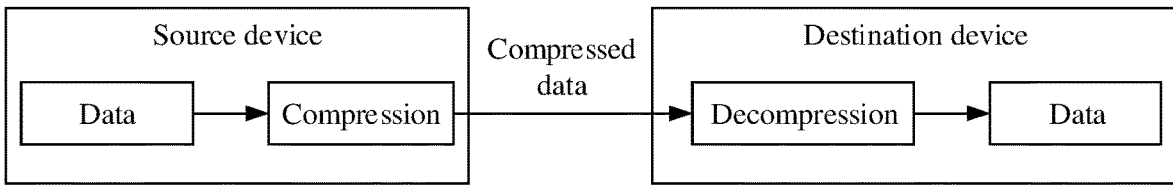
FIG. 7b is a schematic diagram of an application scenario according to an embodiment of this application.

FIG. 7b is a schematic diagram of an application scenario according to an embodiment of this application. As shown in FIG. 7b, in the application scenario, a source device obtains data, compresses the obtained data to obtain compressed data, and then sends the compressed data to a destination device.

In this embodiment of this application, the source device may compress the obtained data and then transmit the compressed data to the destination device. This can reduce a transmission bandwidth.

1. The source device obtains the data.
2. The source device compresses the data to obtain the compressed data.
3. The source device sends the compressed data to the destination device.

The source device compresses the data and then transmits data. This can reduce a transmission bandwidth and improve transmission efficiency.

4. The destination device decompresses the compressed data to obtain data.

Figure 8:
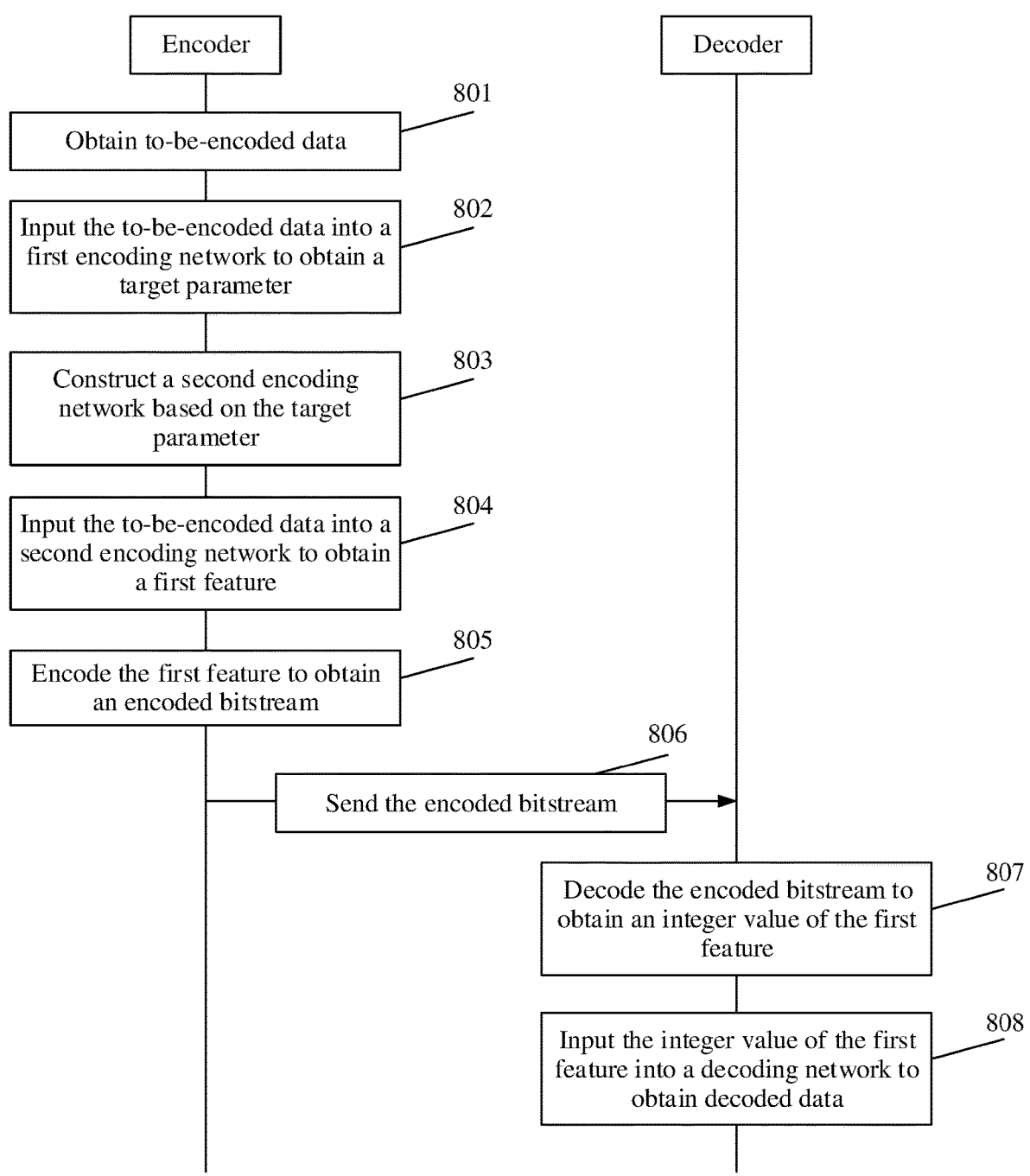
FIG. 8 is a schematic flowchart of an encoding and decoding method according to an embodiment of this application.

FIG. 8 is a flowchart of an encoding and decoding method 800 according to an embodiment of this application. The encoding and decoding method 800 may be performed by an encoder and a decoder. The encoding and decoding method 800 is described as a series of steps or operations. It should be understood that the encoding and decoding method 800 may be performed in various sequences and/or simultaneously, and is not limited to an execution sequence shown in FIG. 8. As shown in FIG. 8, the encoding and decoding method 800 may include the following steps.

Step 801: The encoder obtains to-be-encoded data.

For example, the encoder obtains to-be-encoded data x.

Step 802: The encoder inputs the to-be-encoded data into a first encoding network to obtain a target parameter.

The target parameter may be a parameter weight for all or partial convolution and non-linear activation of a second encoding network.

Optionally, the first encoding network may include a convolution kernel generator (convolutional group or fully connected group). The convolution kernel generator is configured to generate the target parameter based on the to-be-encoded data.

For example, the encoder inputs the to-be-encoded data x into the first encoding network to obtain a target parameter θg.

Step 803: The encoder constructs the second encoding network based on the target parameter.

For example, the encoder constructs a second encoding network $g_a(x; \theta_g)$ based on the target parameter $\theta_g$.

Step 804: The encoder inputs the to-be-encoded data into the second encoding network to obtain a first feature.

The first feature is used to reconstruct the to-be-encoded data, and the first feature may also be referred to as a content feature. For example, the first feature may be a three-dimensional feature map of the to-be-encoded data x.

For example, the encoder inputs the to-be-encoded data x into the second encoding network $g_a(x; \theta_g)$ to obtain a first feature y. y satisfies $y=g_a(x; \theta_g)$.

Step 805: The encoder encodes the first feature to obtain an encoded bitstream (namely, a to-be-decoded bitstream).

In a possible implementation, that the encoder encodes the first feature to obtain the encoded bitstream may include: The encoder first rounds the first feature to obtain an integer value of the first feature, then performs probability estimation on the integer value of the first feature to obtain estimated probability distribution of the integer value of the first feature, and next performs entropy encoding on the integer value of the first feature based on the estimated probability distribution of the integer value of the first feature to obtain the encoded bitstream. The integer value of the first feature may be referred to as a first value feature or a content rounding feature.

For example, the encoder first rounds the first feature y to obtain an integer value ŷ of the first feature. Then the encoder performs probability estimation on the integer value ŷ of the first feature to obtain estimated probability distribution p(ŷ) of the integer value of the first feature. Next the encoder performs entropy encoding on the integer value ŷ of the first feature based on the estimated probability distribution p(ŷ) of the integer value of the first feature to obtain an encoded bitstream.

ŷ satisfies ŷ=round(y), and round is rounding.

p(ŷ) satisfies $p(ŷ)=h(ŷ; \theta_h)$, and $h(ŷ; \theta_h)$ is an entropy estimation network.

Optionally, that the encoder performs probability estimation on the integer value of the first feature to obtain the estimated probability distribution of the integer value of the first feature may include: The encoder performs probability estimation on the integer value of the first feature based on first information to obtain the estimated probability distribution of the integer value of the first feature. The first information includes at least one of context information and side information.

It should be noted that the probability distribution is estimated based on the context information and the side information, so that accuracy of the obtained estimated probability distribution can be improved. This reduces a bit rate in an entropy encoding process, and reduces entropy encoding overheads.

Step 806: The encoder sends the encoded bitstream to the decoder.

Step 807: The decoder decodes the encoded bitstream to obtain an integer value of the first feature.

In a possible implementation, that the decoder decodes the encoded bitstream to obtain the integer value of the first feature may include: The decoder first performs probability estimation on the integer value of the first feature in the encoded bitstream to obtain estimated probability distribution of the integer value of the first feature, and then performs entropy decoding on the encoded bitstream based on the estimated probability distribution of the integer value of the first feature to obtain the integer value of the first feature.

Step 808: The decoder inputs the integer value of the first feature into a decoding network to obtain decoded data.

For example, the decoder inputs the integer value $\hat{y}$ of the first feature into a decoding network $g_s(\hat{y}; \varphi)$ to obtain decoded data $\hat{x}$, where the decoded data $\hat{x}$ satisfies $\hat{x}=g_s(\hat{y}; \varphi)$, $\varphi$ is all or a part of parameter weights for convolution and non-linear activation of the encoding network.

In an existing encoding method, an encoding network (namely, the second encoding network) extracts a content feature (namely, the first feature) of the to-be-encoded data based on a fixed parameter weight, and then encodes the content feature into a bitstream (namely, the encoded bitstream) and sends the bitstream to a decoder side. The decoder side performs decoding and reconstruction on the bitstream to obtain decoded data. In the conventional technology, a parameter weight of the encoding network is not related to the to-be-encoded data. However, in the encoding method provided in embodiments of this application, the to-be-encoded data is first input into the first encoding network, the first encoding network generates the parameter weight of the second encoding network based on the to-be-encoded data, and then the parameter weight of the second encoding network is dynamically adjusted based on an obtained weight, so that the parameter weight of the second encoding network is related to the to-be-encoded data, an expression capability of the second encoding network is increased, and decoded data obtained by the decoder side through decoding and reconstruction on the bitstream obtained by encoding the first feature is closer to the to-be-encoded data. This improves rate distortion performance of an encoding and decoding network.

Figure 9:
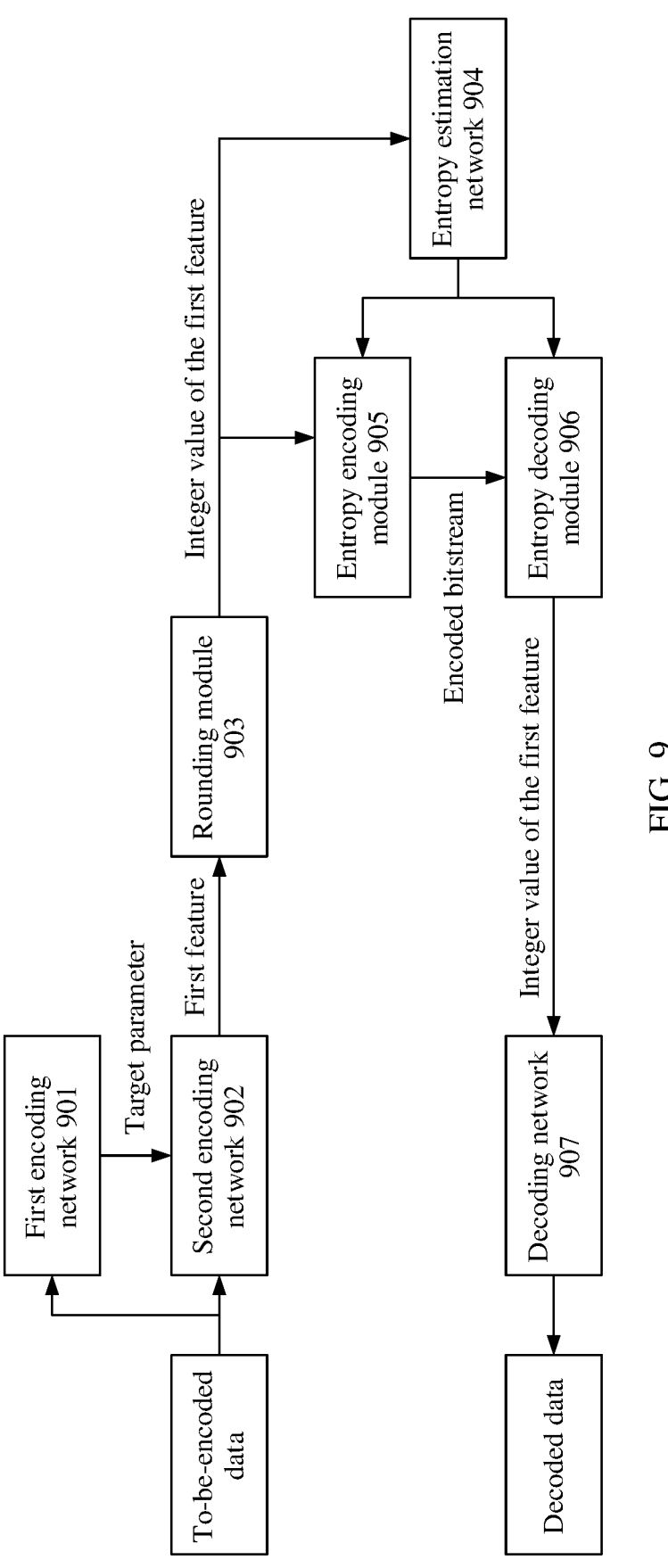
FIG. 9 is a schematic diagram of a structure of an encoding and decoding system according to an embodiment of this application.

The encoding and decoding method 800 provided in this embodiment of this application is applicable to an encoding and decoding system shown in FIG. 9. As shown in FIG. 9, the encoding and decoding system includes a first encoding network 901, a second encoding network 902, a rounding module 903, an entropy estimation network 904, an entropy encoding module 905, an entropy decoding module 906, and a decoding network 907.

As shown in FIG. 9, to-be-encoded data is first input into the first encoding network 901 to obtain a target parameter, and then a parameter of the second encoding network 902 is adjusted based on the target parameter (namely, all or a part of parameter weights for convolution and non-linear activation of the second encoding network 902 are adjusted based on the target parameter).

The to-be-encoded data is input into the second encoding network 902 to obtain a first feature.

The rounding module 903 rounds the first feature to obtain an integer value of the first feature.

The entropy estimation network 904 performs probability estimation on the integer value of the first feature to obtain estimated probability distribution of the integer value of the first feature.

The entropy encoding module 905 performs entropy encoding on the integer value of the first feature based on the estimated probability distribution of the integer value of the first feature to obtain an encoded bitstream.

The entropy decoding module 906 performs entropy decoding on the encoded bitstream based on the estimated probability distribution of the integer value of the first feature to obtain an integer value of the first feature.

The integer value of the first feature is input into the decoding network 907 to obtain decoded data.

Figure 10:
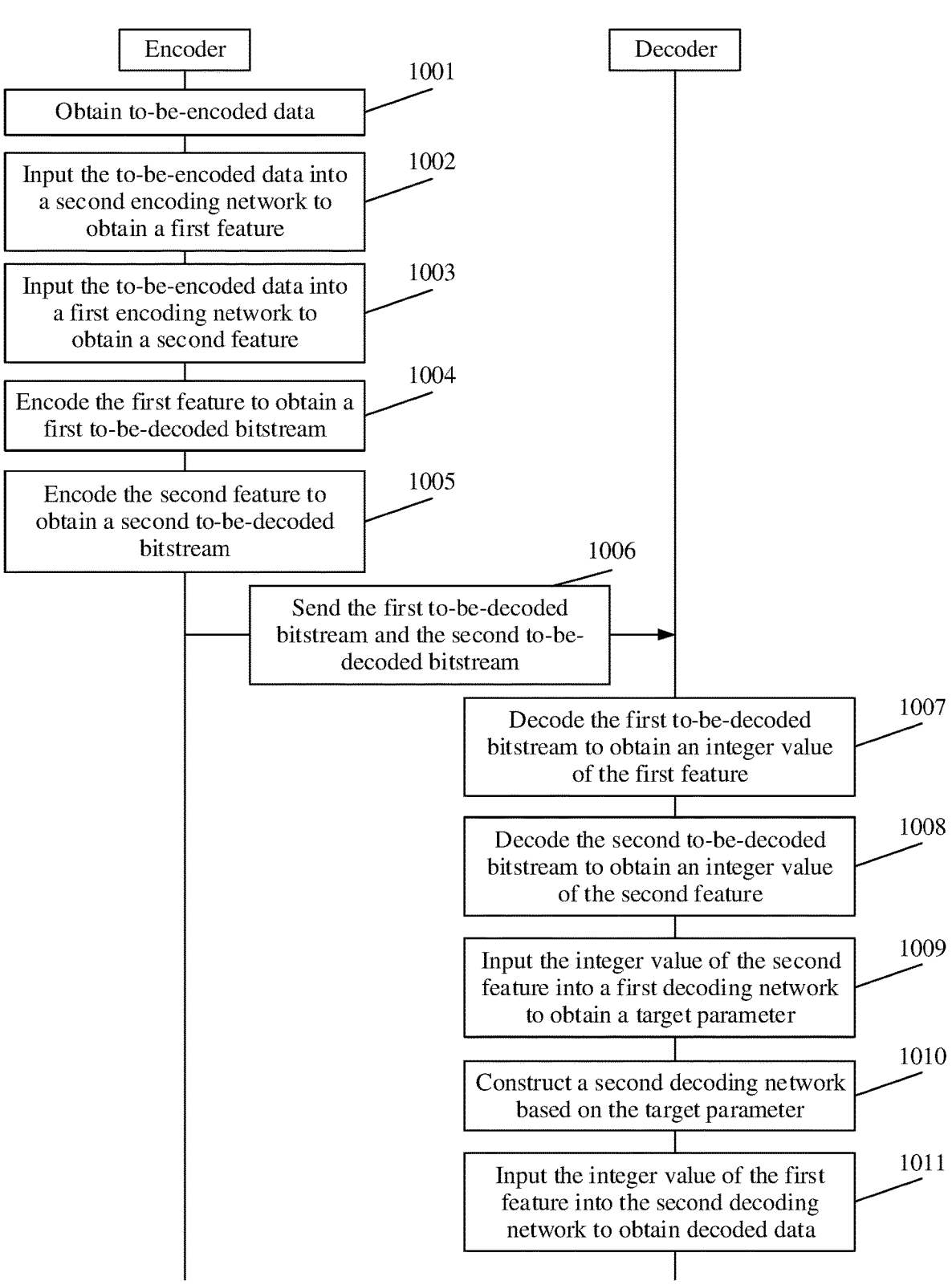
FIG. 10 is a schematic flowchart of another encoding and decoding method according to an embodiment of this application.

FIG. 10 is a flowchart of an encoding and decoding method 1000 according to an embodiment of this application. The encoding and decoding method 1000 may be performed by an encoder and a decoder. The encoding and decoding method 1000 is described as a series of steps or operations. It should be understood that the encoding and decoding method 1000 may be performed in various sequences and/or simultaneously, and is not limited to an execution sequence shown in FIG. 10. As shown in FIG. 10, the encoding and decoding method 1000 may include the following steps.

Step 1001: The encoder obtains to-be-encoded data.

Step 1002: The encoder inputs the to-be-encoded data into a second encoding network to obtain a first feature.

The first feature is used to reconstruct the to-be-encoded data.

Step 1003: The encoder inputs the to-be-encoded data into a first encoding network to obtain a second feature.

The second feature is used to reconstruct a target parameter, the second feature may also be referred to as a model feature, and the target parameter is all or a part of parameter weights for convolution and non-linear activation of a second decoding network.

In a possible implementation, the encoder may first divide the first feature into two parts (a first sub-feature and a second sub-feature) in channel dimension. One part is used to reconstruct the to-be-encoded data (the first sub-feature), and the other part is used to reconstruct the target parameter (the second sub-feature). Then the encoder inputs the second sub-feature into the first encoding network to obtain the second feature.

Optionally, to enable the second feature to be compressed at a small bitstream, before the second sub-feature is input into a third encoding network, the second sub-feature may be further converted via a convolution network and a fully connected network. The second sub-feature before conversion may be referred to as an initial model feature, and a second sub-feature obtained through conversion may be referred to as a model feature.

Step 1004: The encoder encodes the first feature to obtain a first to-be-decoded bitstream.

Step 1005: The encoder encodes the second feature to obtain a second to-be-decoded bitstream.

In a possible implementation, the encoder may encode the first feature and the second feature to obtain a to-be-decoded bitstream.

Step 1006: The encoder sends the first to-be-decoded bitstream and the second to-be-decoded bitstream to the decoder.

Step 1007: The decoder decodes the first to-be-decoded bitstream to obtain an integer value of the first feature.

In a possible implementation, that the decoder decodes the first to-be-decoded bitstream to obtain the integer value of the first feature may include: The decoder performs probability estimation on the integer value of the first feature in the first to-be-decoded bitstream to obtain estimated probability distribution of the integer value of the first feature, and performs entropy decoding on the to-be-decoded bitstream based on the estimated probability distribution of the integer value of the first feature to obtain the integer value of the first feature.

In a possible implementation, performing probability estimation on the integer value of the first feature in the first to-be-decoded bitstream to obtain the estimated probability distribution of the integer value of the first feature includes: performing probability estimation on the integer value of the first feature in the first to-be-decoded bitstream based on first information to obtain the estimated probability distribution of the integer value of the first feature, where the first information includes at least one of context information and side information.

Step 1008: The decoder decodes the second to-be-decoded bitstream to obtain an integer value of the second feature.

The integer value of the second feature may also be referred to as a model rounding feature.

In a possible implementation, that the decoder decodes the second to-be-decoded bitstream to obtain the integer value of the second feature includes: The decoder performs probability estimation on the integer value of the second feature in the second to-be-decoded bitstream to obtain estimated probability distribution of the integer value of the second feature, and performs entropy decoding on the second to-be-decoded bitstream based on the estimated probability distribution of the integer value of the second feature to obtain the integer value of the second feature.

In a possible implementation, performing probability estimation on the integer value of the second feature in the second to-be-decoded bitstream to obtain the estimated probability distribution of the integer value of the second feature includes: performing probability estimation on the integer value of the second feature in the second to-be-decoded bitstream based on the first information to obtain the estimated probability distribution of the integer value of the second feature, where the first information includes at least one of the context information and the side information.

Step 1009: The decoder inputs the integer value of the second feature into a first decoding network to obtain a target parameter.

Step 1010: The decoder constructs the second decoding network based on the target parameter.

Step 1011: The decoder inputs the integer value of the first feature into the second decoding network to obtain decoded data.

In an existing decoding method, a decoding network (namely, the second decoding network) performs decoding and reconstruction on a content value feature (namely, the integer value of the first feature) of the to-be-encoded data based on a fixed parameter weight to obtain the decoded data. In the conventional technology, a parameter weight of the decoding network is not related to to-be-decoded data. However, in this embodiment of this application, a content feature and a model feature (namely, the first feature and the second feature) of the to-be-decoded data are encoded into the to-be-decoded bitstream, then a decoder side decodes the to-be-decoded bitstream to obtain the integer value of the second feature, the integer value of the second feature is input into the first decoding network to obtain a parameter weight of the second decoding network, and then the parameter weight of the second decoding network is dynamically adjusted based on the parameter weight, so that the parameter weight of the second decoding network is related to the to-be-decoded data, an expression capability of the second decoding network is improved, and the decoded data obtained by the second decoding network through decoding and reconstruction is closer to the to-be-encoded data. This improves rate distortion performance of an encoding and decoding network.

Figure 11:
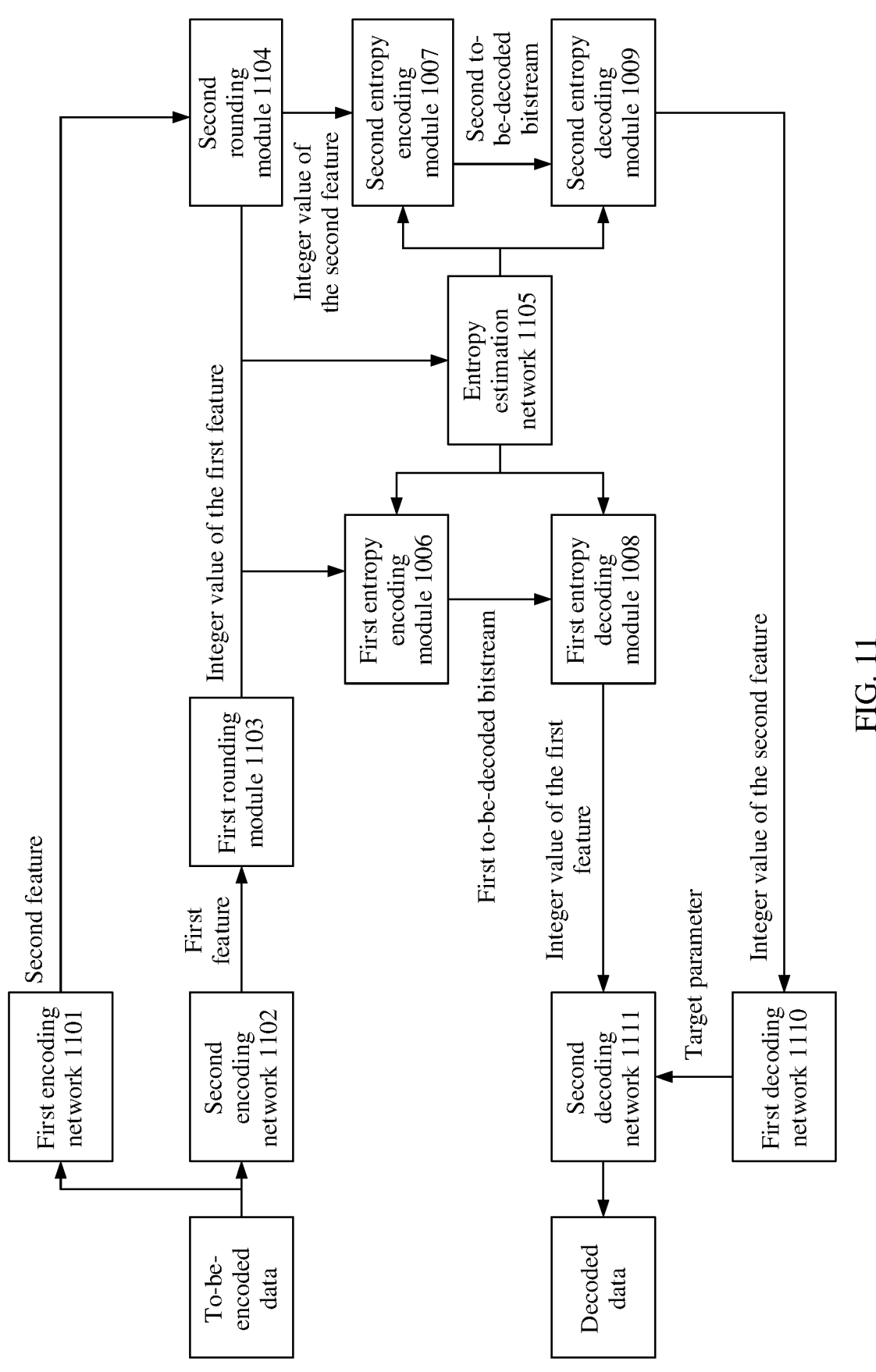
FIG. 11 is a schematic diagram of a structure of another encoding and decoding system according to an embodiment of this application.

The encoding and decoding method 1000 provided in this embodiment of this application is applicable to an encoding and decoding system shown in FIG. 11. As shown in FIG. 11, the encoding and decoding system includes a first encoding network 1101, a second encoding network 1102, a first rounding module 1103, a second rounding module 1104, an entropy estimation network 1105, a first entropy encoding module 1106, a second entropy encoding module 1107, a first entropy decoding module 1108, a second entropy decoding module 1109, a first decoding network 1110, and a second decoding network 1111.

As shown in FIG. 11, to-be-encoded data is first input into the second encoding network 1102 to obtain a first feature, and then the to-be-encoded data is input into the first encoding network 1101 to obtain a second feature.

The first rounding module 1103 rounds the first feature to obtain an integer value of the first feature.

The second rounding module 1104 rounds the second feature to obtain an integer value of the second feature.

The entropy estimation network 1105 first performs probability estimation on the integer value of the first feature to obtain estimated probability distribution of the integer value of the first feature, and then performs probability estimation on the integer value of the second feature to obtain estimated probability distribution of the integer value of the second feature.

The first entropy encoding module 1106 performs entropy encoding on the integer value of the first feature based on the estimated probability distribution of the integer value of the first feature to obtain a first to-be-decoded bitstream.

The second entropy encoding module 1107 performs entropy encoding on the integer value of the second feature based on the estimated probability distribution of the integer value of the second feature to obtain a second to-be-decoded bitstream.

The first entropy decoding module 1108 performs entropy decoding on the first to-be-decoded bitstream based on the estimated probability distribution of the integer value of the first feature to obtain an integer value of the first feature.

The second entropy decoding module 1109 performs entropy decoding on the second to-be-decoded bitstream based on the estimated probability distribution of the integer value of the second feature to obtain an integer value of the second feature.

The integer value of the second feature is first input into the first decoding network 1110 to obtain a target parameter, and then a parameter of the second decoding network 1111 is adjusted based on the target parameter (namely, all or a part of parameter weights for convolution and non-linear activation of the second decoding network 1111 are adjusted based on the target parameter).

The integer value of the first feature is input into the second decoding network 1111 to obtain decoded data.

Figure 12:
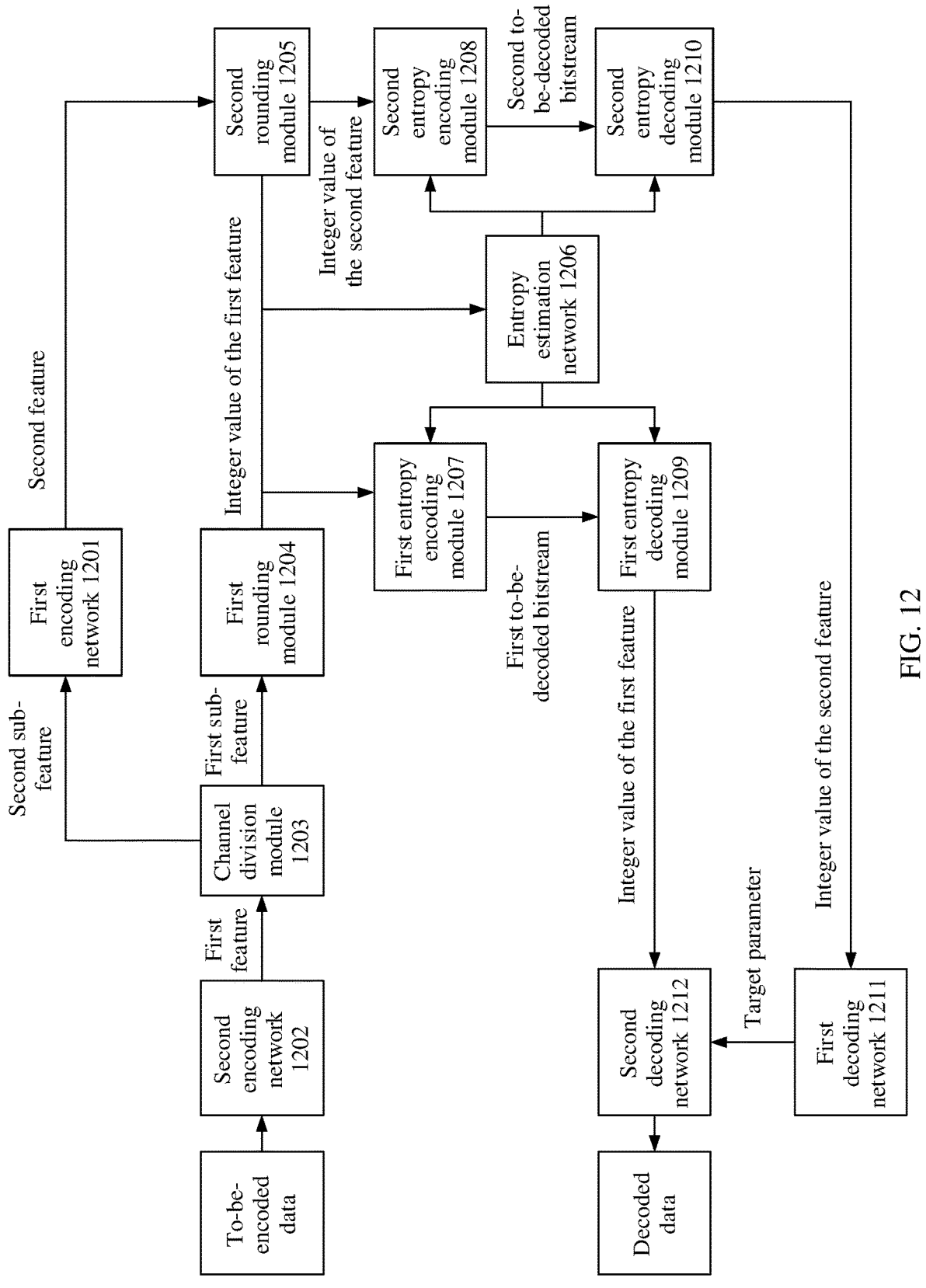
FIG. 12 is a schematic diagram of a structure of still another encoding and decoding system according to an embodiment of this application.

The encoding and decoding method 1000 provided in this embodiment of this application is also applicable to an encoding and decoding system shown in FIG. 12. As shown in FIG. 12, the encoding and decoding system includes a first encoding network 1201, a second encoding network 1202, a channel division module 1203, a first rounding module 1204, a second rounding module 1205, an entropy estimation network 1206, a first entropy encoding module 1207, a second entropy encoding module 1208, a first entropy decoding module 1209, a second entropy decoding module 1210, a first decoding network 1211, and a second decoding network 1212.

As shown in FIG. 12, to-be-encoded data is first input into the second encoding network 1102 to obtain a first feature.

The first feature is input into the channel division module 1203 and is divided into a first sub-feature and a second sub-feature in channel dimension.

The second sub-feature is input into the first encoding network 1201 to obtain a second feature.

The first rounding module 1204 rounds the first sub-feature to obtain an integer value of the first feature.

The second rounding module 1205 rounds the second feature to obtain an integer value of the second feature.

The entropy estimation network 1206 first performs probability estimation on the integer value of the first feature to obtain estimated probability distribution of the integer value of the first feature, and then performs probability estimation on the integer value of the second feature to obtain estimated probability distribution of the integer value of the second feature.

The first entropy encoding module 1207 performs entropy encoding on the integer value of the first feature based on the estimated probability distribution of the integer value of the first feature to obtain a first to-be-decoded bitstream.

The second entropy encoding module 1208 performs entropy encoding on the integer value of the second feature based on the estimated probability distribution of the integer value of the second feature to obtain a second to-be-decoded bitstream.

The first entropy decoding module 1209 performs entropy decoding on the first to-be-decoded bitstream based on the estimated probability distribution of the integer value of the first feature to obtain an integer value of the first feature.

The second entropy decoding module 1210 performs entropy decoding on the second to-be-decoded bitstream based on the estimated probability distribution of the integer value of the second feature to obtain an integer value of the second feature.

The integer value of the second feature is first input into the first decoding network 1211 to obtain a target parameter, and then a parameter of the second decoding network 1212 is adjusted based on the target parameter (namely, all or a part of parameter weights for convolution and non-linear activation of the second decoding network 1212 are adjusted based on the target parameter).

The integer value of the first feature is input into the second decoding network 1212 to obtain decoded data.

Figure 13:
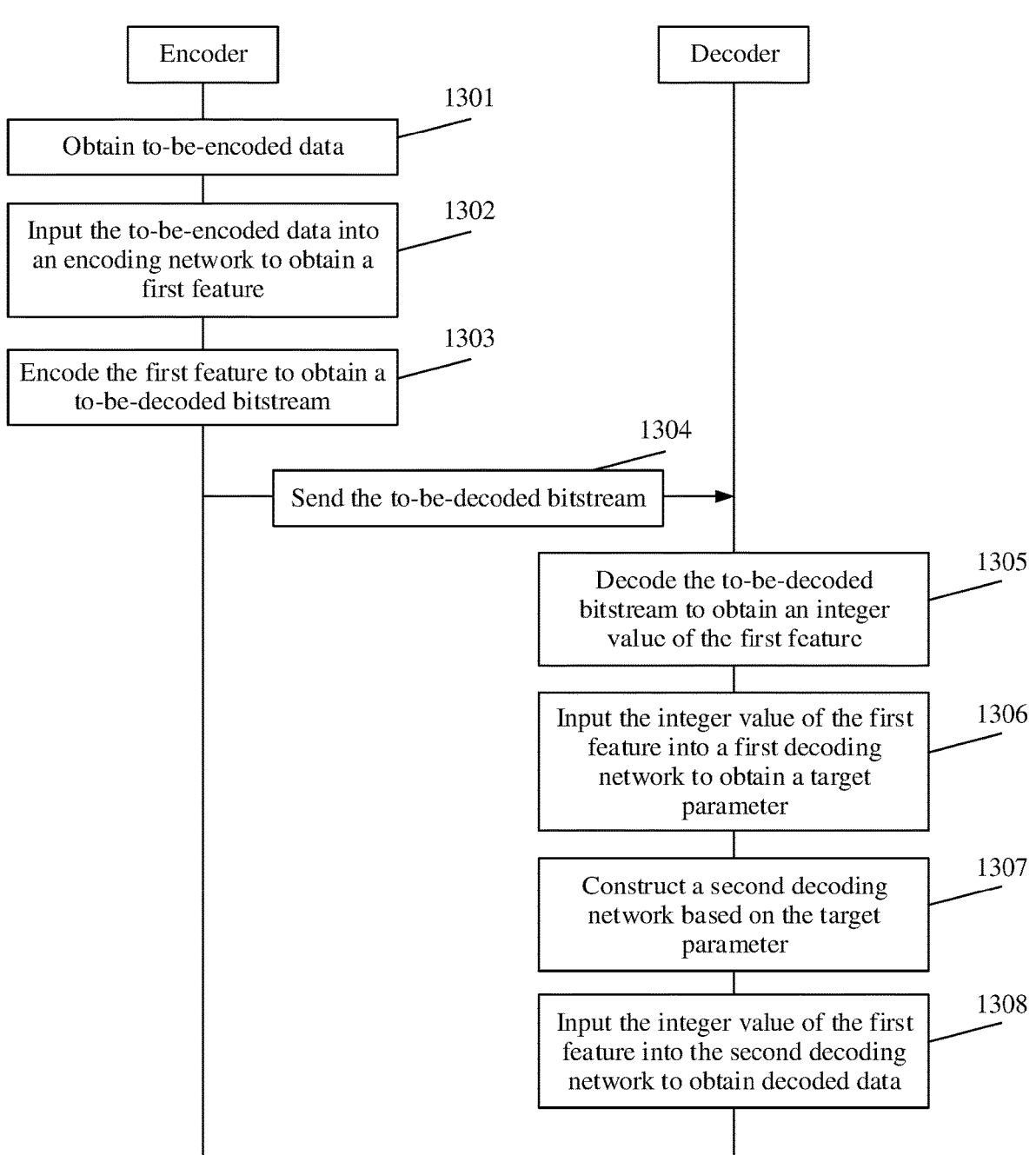
FIG. 13 is a schematic flowchart of still another encoding and decoding method according to an embodiment of this application.

FIG. 13 is a flowchart of an encoding and decoding method 1300 according to an embodiment of this application. The encoding and decoding method 1300 may be performed by an encoder and a decoder. The encoding and decoding method 1300 is described as a series of steps or operations. It should be understood that the encoding and decoding method 1300 may be performed in various sequences and/or simultaneously, and is not limited to an execution sequence shown in FIG. 13. As shown in FIG. 13, the encoding and decoding method 1300 may include the following steps.

Step 1301: The encoder obtains to-be-encoded data.

Step 1302: The encoder inputs the to-be-encoded data into an encoding network to obtain a first feature.

Step 1303: The encoder encodes the first feature to obtain a to-be-decoded bitstream.

Step 1304: The encoder sends the to-be-decoded bitstream to the decoder.

Step 1305: The decoder decodes the to-be-decoded bitstream to obtain an integer value of the first feature.

In a possible implementation, that the decoder decodes the to-be-decoded bitstream to obtain the integer value of the first feature may include: The decoder performs probability estimation on the integer value of the first feature in the to-be-decoded bitstream to obtain estimated probability distribution of the integer value of the first feature, and performs entropy decoding on the to-be-decoded bitstream based on the estimated probability distribution of the integer value of the first feature to obtain the integer value of the first feature.

In a possible implementation, performing probability estimation on the integer value of the first feature in the to-be-decoded bitstream to obtain the estimated probability distribution of the integer value of the first feature includes: performing probability estimation on the integer value of the first feature in the to-be-decoded bitstream based on first information to obtain the estimated probability distribution of the integer value of the first feature, where the first information includes at least one of context information and side information.

Step 1306: The decoder inputs the integer value of the first feature into a first decoding network to obtain a target parameter.

Optionally, the first decoding network may include a convolution kernel generator (convolutional group or fully connected group). The convolution kernel generator is configured to generate the target parameter based on the integer value of the first feature of the to-be-encoded data.

Step 1307: The decoder constructs a second decoding network based on the target parameter.

Step 1308: The decoder inputs the integer value of the first feature into the second decoding network to obtain decoded data.

In an existing decoding method, a decoding network (namely, the second decoding network) performs decoding and reconstruction on a content value feature (namely, the integer value of the first feature) of the to-be-encoded data based on a fixed parameter weight to obtain the decoded data. In the conventional technology, a parameter weight of the decoding network is not related to to-be-decoded data. However, in this embodiment of this application, the to-be-decoded bitstream obtained by encoding a feature (namely, the first feature) of the to-be-decoded data is decoded to obtain the integer value of the first feature, the integer value of the first feature is input into the first decoding network to obtain a parameter weight of the second decoding network, and then the parameter weight of the second decoding network is dynamically adjusted based on the parameter weight, so that the parameter weight of the second decoding network is related to the to-be-decoded data, an expression capability of the second decoding network is improved, and the decoded data obtained by the second decoding network through decoding and reconstruction is closer to the to-be-encoded data. This improves rate distortion performance of an encoding and decoding network.

Figure 14:
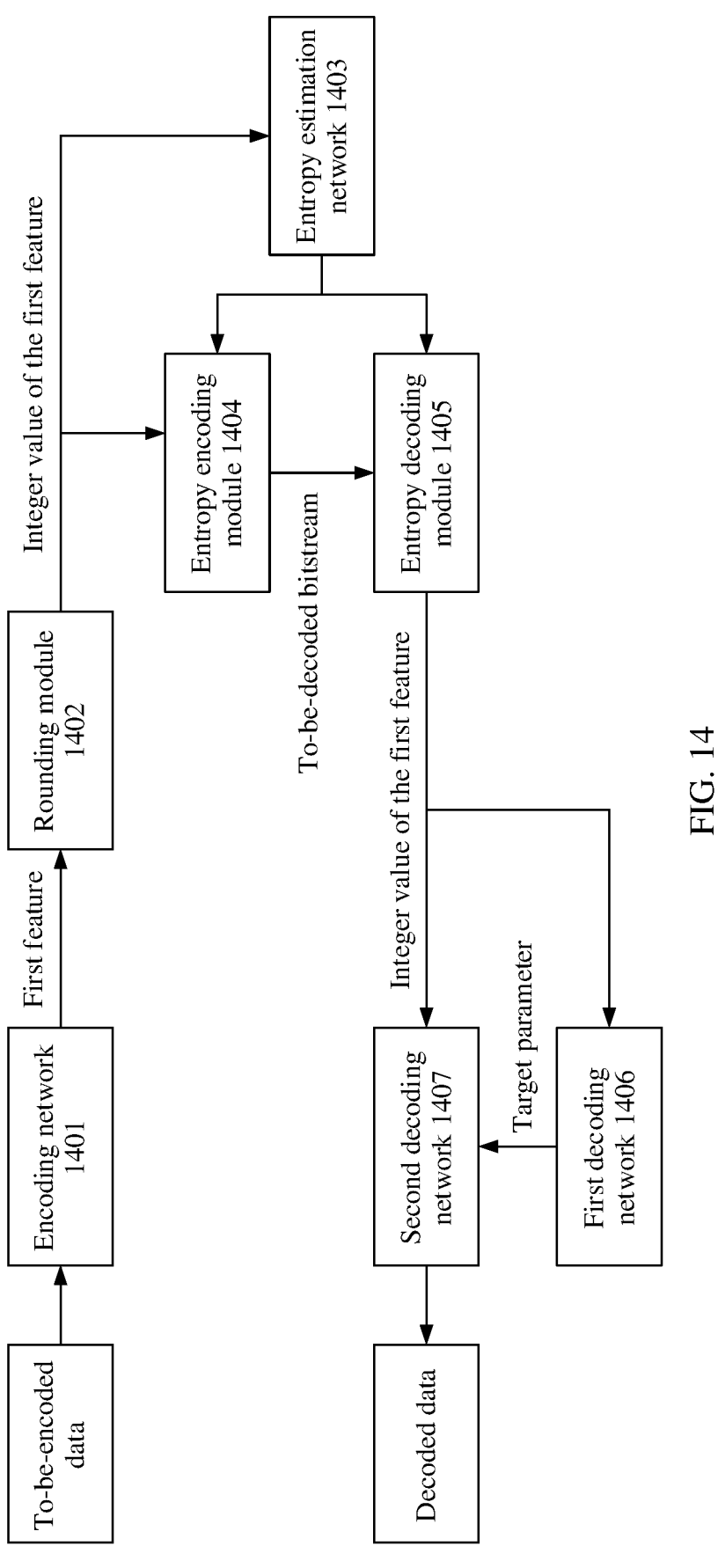
FIG. 14 is a schematic diagram of a structure of yet another encoding and decoding system according to an embodiment of this application.

The encoding and decoding method 1300 provided in this embodiment of this application is applicable to an encoding and decoding system shown in FIG. 14. As shown in FIG. 14, the encoding and decoding system includes an encoding network 1401, a rounding module 1402, an entropy estimation network 1403, an entropy encoding module 1404, an entropy decoding module 1405, a first decoding network 1406, and a second decoding network 1407.

As shown in FIG. 14, to-be-encoded data is first input into the encoding network 1401 to obtain a first feature.

The rounding module 1402 rounds the first feature to obtain an integer value of the first feature.

The entropy estimation network 1403 performs probability estimation on the integer value of the first feature to obtain estimated probability distribution of the integer value of the first feature.

The entropy encoding module 1404 performs entropy encoding on the integer value of the first feature based on the estimated probability distribution of the integer value of the first feature to obtain a to-be-decoded bitstream.

The entropy decoding module 1405 performs entropy decoding on the to-be-decoded bitstream based on the estimated probability distribution of the integer value of the first feature to obtain an integer value of the first feature.

The integer value of the first feature is input into the first decoding network 1406 to obtain a target parameter, and then a parameter of the second decoding network 1407 is adjusted based on the target parameter (namely, all or a part of parameter weights for convolution and non-linear activation of the second decoding network 1407 are adjusted based on the target parameter).

The integer value of the first feature is input into the second decoding network 1407 to obtain decoded data.

Figure 15:
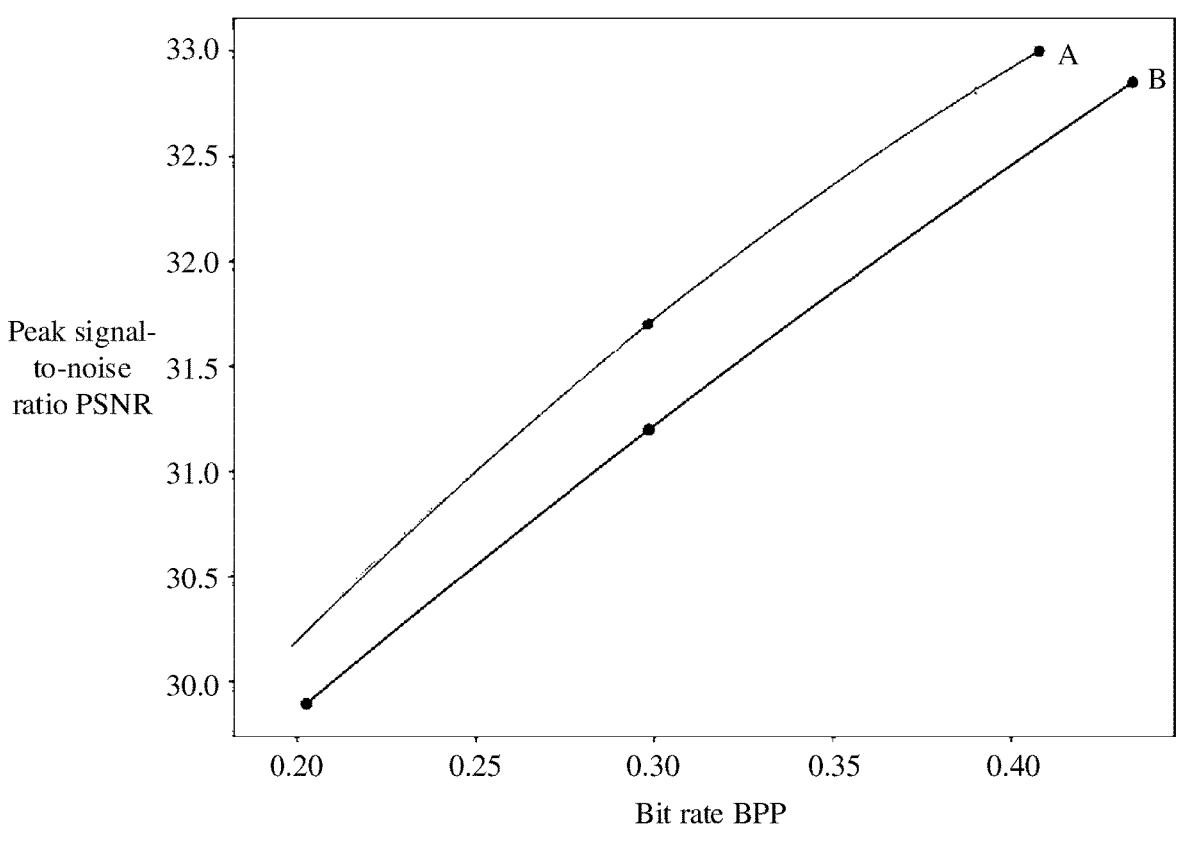
FIG. 15 is a schematic diagram of performance of an encoding and decoding method according to an embodiment of this application.

FIG. 15 is a schematic diagram of performance of an encoding and decoding method according to an embodiment of this application. A coordinate system in FIG. 15 shows performance of separately encoding and decoding a test set by using embodiments of this application and the conventional technology and based on a peak signal-to-noise ratio (Peak Signal-to-Noise Ratio, PSNR) indicator. The test set is the Kodak (Kodak) test set. The Kodak test set includes 24 pictures in a portable network graphics (Portable Network Graphics, PNG) format. Resolution of the 24 pictures may be 768×512 or 512×768. In the coordinate system in FIG. 15, a horizontal coordinate indicates a bit rate (bits per pixel, BPP) and a vertical coordinate indicates a PSNR. The BPP indicates a quantity of bits used for storing each pixel. A smaller value indicates a smaller compression bit rate. The PSNR is an objective standard for evaluating a picture. A higher PSNR indicates better picture quality.

A line segment A in the coordinate system shown in FIG. 15 represents embodiments of this application, and a line segment B represents the conventional technology. It can be seen from FIG. 15 that, when BPP indicators are the same, the PSNR indicators in embodiments of this application are all greater than those in the conventional technology, and when picture compression quality (that is, the PSNR indicators) is the same, BPP indicators in embodiments of this application are all less than those in the conventional technology. Rate distortion performance in embodiments of this application is higher than that in the conventional technology, and rate distortion performance of a data encoding and decoding method are improved in embodiments of this application.

A scenario to which encoding and decoding methods provided in embodiments of this application may be applied includes but is not limited to all services related to capture, storage, and transmission of data such as a picture, a video, and a voice in an electronic device, a cloud service, and video surveillance (for example, photographing and a video or audio service of the electronic device, an album, a cloud album, video surveillance, video conference, and model compression).

Figure 16:
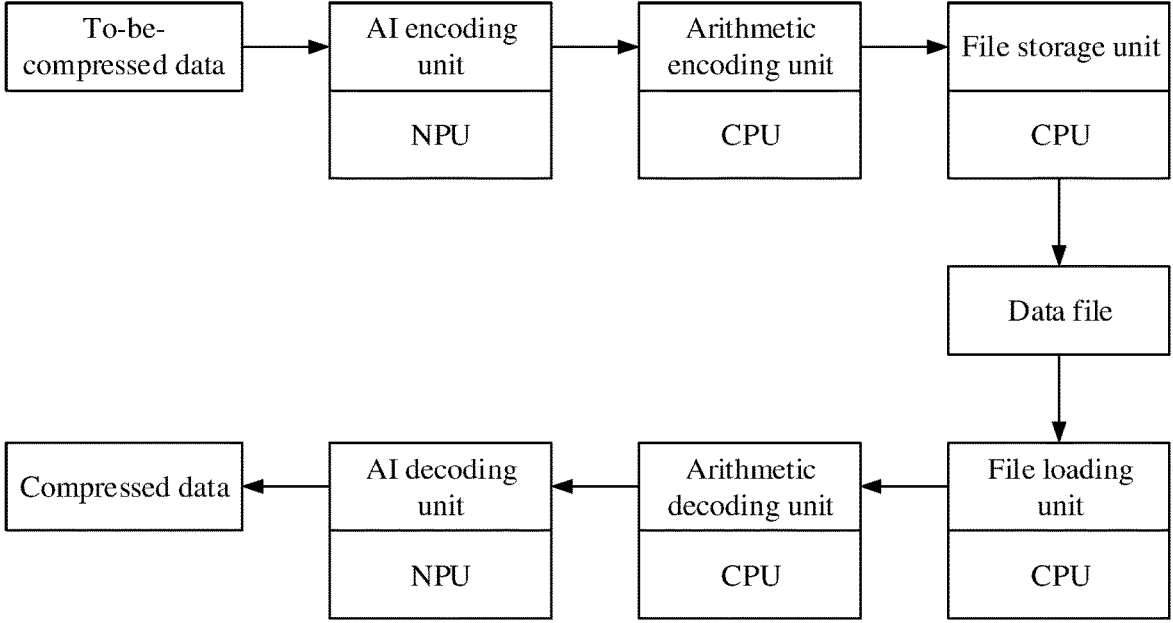
FIG. 16 is a schematic diagram of an application scenario according to an embodiment of this application.

FIG. 16 is a schematic diagram of an application scenario according to an embodiment of this application. As shown in FIG. 16, in the application scenario, after obtaining picture data (to-be-compressed data) through photographing, an electronic device inputs the picture data obtained through photographing (for example, picture data in a RAW format, a YUV format, or an RGB format) into an AI encoding unit of the electronic device. The AI encoding unit of the electronic device invokes a first encoding network, a second encoding network, and an entropy estimation network to transform the picture data into an output feature with lower redundancy and to generate estimated probability distribution of the output feature. An arithmetic encoding unit of the electronic device invokes an entropy encoding module to encode the output feature into a data file based on the estimated probability distribution of the output feature. A file storage unit stores the data file generated by the entropy encoding module to a corresponding storage location of the electronic device. When the electronic device needs to use the data file, a file loading unit loads the data file from the corresponding storage location of the electronic device, and the data file is input into an arithmetic decoding unit. The arithmetic decoding unit invokes an entropy decoding module to decode the data file to obtain an output feature, and the output feature is input into an AI decoding unit. The AI decoding unit invokes a first decoding network, a second decoding network, and a third decoding network to perform inverse transformation on the output feature and to parse the output feature into picture data (for example, RGB picture data), namely, compressed data. The AI encoding unit and the AI decoding unit may be deployed in a neural network processing unit (NPU) or a graphics processing unit (GPU) of the electronic device. The arithmetic encoding unit, the file storage unit, the file loading unit, and the arithmetic decoding unit may be deployed in a CPU of the electronic device.

Figure 17:
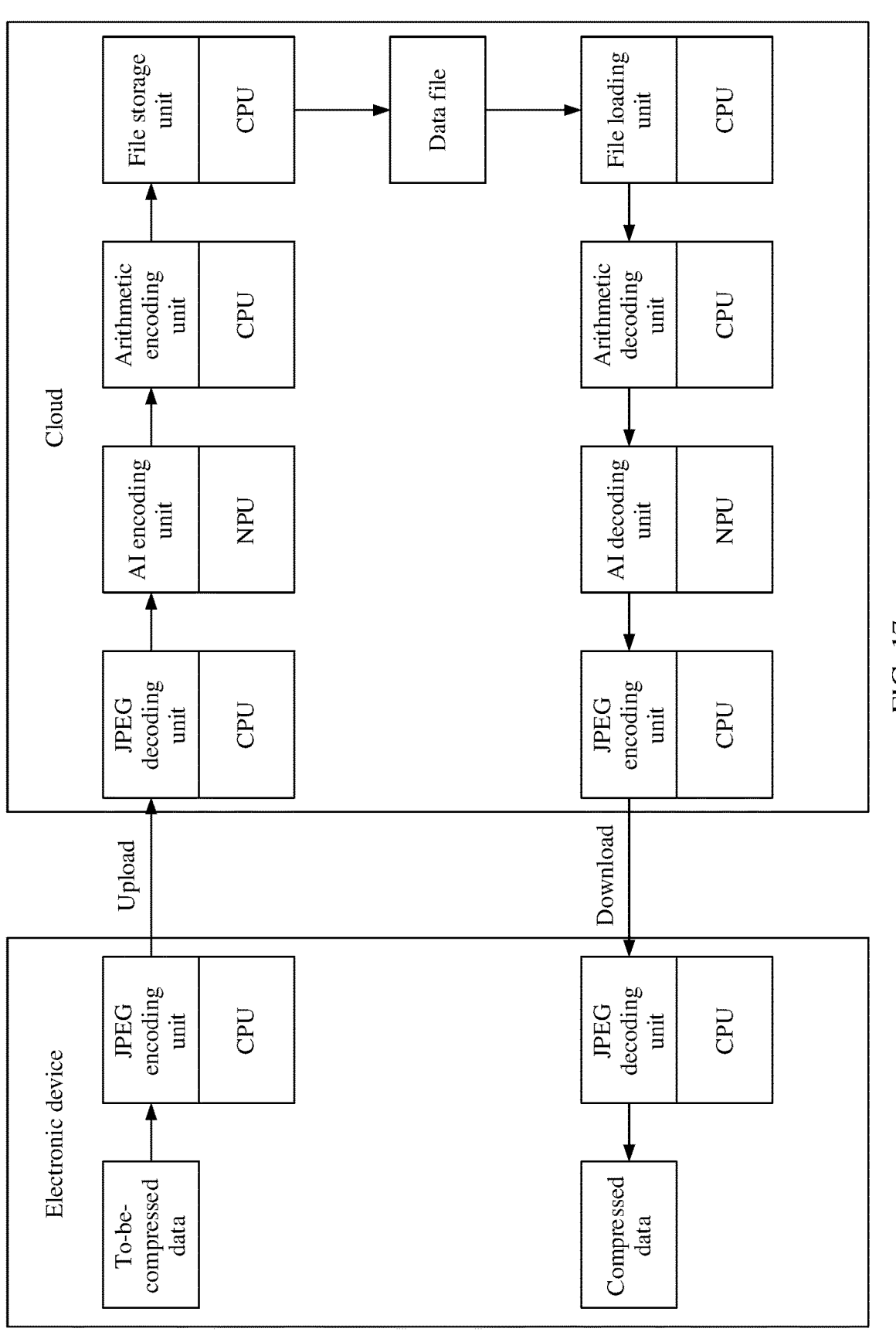
FIG. 17 is a schematic diagram of another application scenario according to an embodiment of this application.

FIG. 17 is a schematic diagram of another application scenario according to an embodiment of this application. As shown in FIG. 17, in the application scenario, an electronic device directly uploads or encodes stored picture data (to-be-compressed data) (for example, JPEG encoding) before uploading, to a cloud (for example, a server). The cloud directly inputs or decodes received picture data (for example, JPEG decoding) before inputting, to an AI encoding unit at the cloud. The AI encoding unit at the cloud invokes a first encoding network, a second encoding network and an entropy estimation network to transform the picture data into an output feature with lower redundancy and to generate estimated probability distribution of the output feature. An arithmetic encoding unit at the cloud invokes an entropy encoding module to encode the output feature into a data file based on the estimated probability distribution of the output feature. A file storage unit stores the data file generated by the entropy encoding module to a corresponding storage location at the cloud. When the electronic device needs to use the data file, the electronic device sends a download request to the cloud. After the cloud receives the download request, a file loading unit loads the data file from the corresponding storage location at the cloud, and the data file is input into an arithmetic decoding unit. The arithmetic decoding unit invokes an entropy decoding module to decode the data file to obtain an output feature, and the output feature is input into an AI decoding unit. The AI decoding unit invokes a first decoding network, a second decoding network, and a third decoding network to perform inverse transformation on the output feature and to parse the output feature into picture data. The cloud directly sends or encodes the picture data (compressed data) before sending, to the electronic device.

Figure 18:
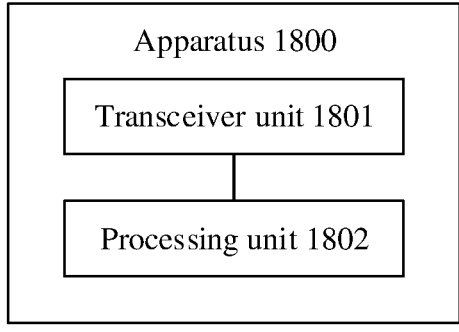
FIG. 18 is a schematic diagram of a structure of an encoding and decoding apparatus according to an embodiment of this application.
Figure 19:
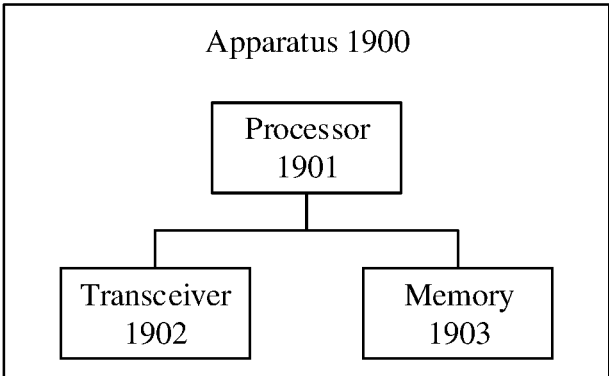
FIG. 19 is a schematic diagram of a structure of another encoding and decoding apparatus according to an embodiment of this application.

The following describes, with reference to FIG. 18 and FIG. 19, encoding and decoding apparatuses configured to perform the foregoing encoding and decoding methods.

It may be understood that, to implement the foregoing functions, the encoding and decoding apparatus includes a corresponding hardware and/or software module that performs each function. With reference to algorithm steps of each example described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment of this application, the encoding and decoding apparatus may be divided into functional modules based on the foregoing method examples. For example, each functional module may be obtained through division based on each corresponding function, or two or more functions may be integrated into one processing module. The foregoing integrated module may be implemented in a form of hardware. It should be noted that, in this embodiment, division into the modules is an example, is merely logical function division, and may be other division during actual implementation.

When each functional module is obtained through division based on each corresponding function, FIG. 18 is a possible schematic diagram of composition of the encoding and decoding apparatus in the foregoing embodiments. As shown in FIG. 18, the apparatus 1800 may include a transceiver unit 1801 and a processing unit 1802. The processing unit 1802 may implement the method performed by the encoding apparatus, the decoding apparatus, the encoder, or the decoder in the foregoing method embodiments, and/or another process of the technology described in this specification.

It should be noted that all related content of the steps in the foregoing method embodiments may be cited in function description of corresponding functional modules. Details are not described herein again.

When an integrated unit is used, the apparatus 1800 may include a processing unit, a storage unit, and a communication unit. The processing unit may be configured to control and manage an action of the apparatus 1800, for example, may be configured to support the apparatus 1800 in performing the steps performed by the foregoing units. The storage unit may be configured to support the apparatus 1800 in storing program code, data, and/or the like. The communication unit may be configured to support communication between the apparatus 1800 and another device.

The processing unit may be a processor or a controller. The processor may implement or execute various example logical blocks, modules, and circuits described with reference to content disclosed in this application. The processor may be alternatively a combination for implementing a computing function, for example, a combination including one or more microprocessors and a combination of a digital signal processor (DSP) and a microprocessor. The storage unit may be a memory. The communication unit may be specifically a device, for example, a radio frequency circuit, a Bluetooth chip, a Wi-Fi chip, or the like that interacts with another electronic device.

In a possible implementation, the encoding and decoding apparatus in this embodiment of this application may be an apparatus 1900 having a structure shown in FIG. 19. The apparatus 1900 includes a processor 1901 and a transceiver 1902. Related functions implemented by the transceiver unit 1801 and the processing unit 1802 in FIG. 18 may be implemented by the processor 1901.

Optionally, the apparatus 1900 may further include a memory 1903. The processor 1901 and the memory 1903 communicate with each other through an internal connection path. A related function implemented by the storage unit in FIG. 18 may be implemented by the memory 1903.

An embodiment of this application further provides a computer storage medium. The computer storage medium stores computer instructions. When the computer instructions are run on an electronic device, the electronic device is enabled to perform the foregoing related method steps, to implement the encoding and decoding methods in the foregoing embodiments.

An embodiment of this application further provides a computer program product. When the computer program product runs on a computer, the computer is enabled to perform the foregoing related steps, to implement the encoding and decoding methods in the foregoing embodiments.

An embodiment of this application further provides an encoding and decoding apparatus. The apparatus may be specifically a chip, an integrated circuit, a component, or a module. Specifically, the apparatus may include a connected processor and a memory configured to store instructions, or the apparatus includes at least one processor, configured to obtain instructions from an external memory. When the apparatus runs, the processor may execute instructions, so that the chip performs the encoding and decoding methods in the foregoing method embodiments.

Figure 20:
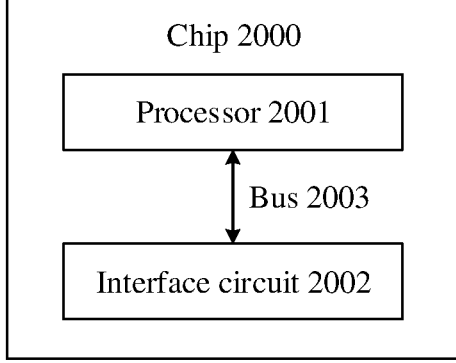
FIG. 20 is a schematic diagram of a structure of a chip according to an embodiment of this application.

FIG. 20 is a schematic diagram of a structure of a chip 2000. The chip 2000 includes one or more processors 2001 and an interface circuit 2002. Optionally, the chip 2000 may further include a bus 2003.

The processor 2001 may be an integrated circuit chip, and has a signal processing capability. In an implementation process, each step of the foregoing encoding method may be completed by using an integrated logic circuit of hardware in the processor 2001 or by using instructions in a form of software.

The processor 2001 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods and steps that are disclosed in embodiments of this application. The general-purpose processor may be a microprocessor, or the processor may be any conventional processor or the like.

The interface circuit 2002 may send or receive data, instructions, or information. The processor 2001 may process the data, the instructions, or other information received through the interface circuit 2002, and send, through the interface circuit 2002, information obtained through processing.

Optionally, the chip further includes a memory. The memory may include a read-only memory and a random access memory, and provide operation instructions and data for the processor. A part of the memory may further include a non-volatile random access memory (NVRAM).

Optionally, the memory stores an executable software module or a data structure, and the processor may perform a corresponding operation by invoking operation instructions (the operation instructions may be stored in an operating system) stored in the memory.

Optionally, the chip may be used in the electronic device or DSP in embodiments of this application. Optionally, the interface circuit 2002 may be configured to output an execution result of the processor 2001. For the encoding method provided in one or more embodiments of this application, refer to the foregoing embodiments. Details are not described herein again.

It should be noted that functions corresponding to each of the processor 2001 and the interface circuit 2002 may be implemented by using a hardware design, may be implemented by using a software design, or may be implemented by using a combination of software and hardware. This is not limited herein.

The electronic device, the computer storage medium, the computer program product, or the chip provided in embodiments is configured to perform the corresponding method provided above. Therefore, for beneficial effect that can be achieved, refer to the beneficial effect of the corresponding method provided above. Details are not described herein again.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brevity of description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The foregoing units described as separate parts may or may not be physically separate, and parts displayed as units may or may not be physical units, may be located in one position, or may be distributed on a plurality of network units. Some or all of the units may be selected based on an actual requirement to achieve objectives of solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application may be implemented in a form of a software product. The computer software product is stored in a storage medium, and includes several instructions for instructing a computer device (which may be a personal computer, a server, a network device, or the like) to perform all or some of the steps of the foregoing methods described in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions provide example implementations of this application, but are not intended to limit the protection scope of this application. Any variation or replacement readily figured out by a person skilled in the art within the technical scope disclosed in this application may fall within the protection scope of this application.

What is claimed is:

1. An encoding method, comprising:

obtaining, by an encoding device, to-be-encoded data;

inputting, by the encoding device, the to-be-encoded data into a first encoding network to obtain a target parameter, wherein the target parameter comprises a parameter weight for convolution and non-linear activation of a second encoding network;

constructing, by the encoding device, the second encoding network based on the target parameter;

inputting, by the encoding device, the to-be-encoded data into the second encoding network to obtain a first feature; and encoding, by the encoding device, the first feature to obtain an encoded bitstream;

wherein the method further comprises:

rounding the first feature y to obtain an integer value $\hat{y}$ of the first feature; and performing probability estimation on the integer value $\hat{y}$ of the first feature to obtain an estimated probability distribution $p(\hat{y})$ of the integer value $\hat{y}$ of the first feature;

wherein $p(\hat{y})$ satisfies $p(\hat{y})=h(\gamma; \theta_h)$, where $h(\hat{y}; \theta_h)$ is an entropy estimation network.

2. The method according to claim 1, wherein encoding the first feature comprises:

performing entropy encoding on the integer value of the first feature based on the estimated probability distribution of the integer value of the first feature to obtain the encoded bitstream.

3. The method according to claim 1, wherein the first encoding network comprises a convolution kernel generator.

4. The method according to claim 1, wherein the first feature is a three-dimensional feature map of the to-be-encoded data.

5. The method according to claim 1, wherein the first feature is y, and y satisfies $y=g_a(x; \theta_g)$, where the target parameter is $\theta_g$, the to-be-encoded data is x, and the second encoding network is $g_a(x; \theta_g)$.

6. The method according to claim 1, wherein the encoded data corresponds to a compressed version of the to-be-encoded data.

7. The method according to claim 1, wherein performing probability estimation on the integer value of the first feature is based on first information comprising at least one of context information or side information.

8. The method according to claim 1, further comprising:

inputting the integer value $\hat{y}$ of the first feature into a decoding network $g_s(\hat{y}; \varphi)$ to obtain decoded data $\hat{x}$, where the decoded data $\hat{x}$ satisfies $\hat{x}=g_s(\hat{y}; \varphi)$, where $\varphi$ comprises one or more parameter weights for convolution and non-linear activation of the second encoding network.

9. A decoding method, comprising:

obtaining, by a decoding device, a to-be-decoded bit-stream;

decoding, by the decoding device, the to-be-decoded bitstream to obtain an integer value of a first feature, wherein the integer value of the first feature is for obtaining decoded data and a target parameter;

inputting, by the decoding device, the integer value of the first feature into a first decoding network to obtain the target parameter, wherein the target parameter comprises a parameter weight for convolution and non-linear activation of a second encoding network;

constructing, by the decoding device, the second decoding network based on the target parameter; and inputting, by the decoding device, the integer value of the first feature into the second decoding network to obtain the decoded data, wherein the method further comprises: performing probability estimation on an integer value $\hat{y}$ of the first feature in the to-be-decoded bitstream to obtain an estimated probability distribution $p(\hat{y})$ of the integer value $\hat{y}$ of the first feature, wherein $p(\hat{y})$ satisfies $p(\hat{y})=h(\hat{y}; \theta_h)$, where $h(\hat{y}; \theta_h)$ is an entropy estimation network.

10. The method according to claim 9, wherein decoding the to-be-decoded bitstream comprises:

performing entropy decoding on the to-be-decoded bit-stream based on the estimated probability distribution of the integer value of the first feature to obtain the integer value of the first feature.

11. The method according to claim 9, wherein the first feature is y, and y satisfies $y=g_a(x; \theta_g)$, where the target parameter is $\theta_g$, the to-be-encoded data is x, and the second encoding network is $g_a(x; \theta_g)$.

12. The method according to claim 9, wherein performing probability estimation on the integer value of the first feature in the to-be-decoded bitstream is based on first information comprising at least one of context information or side information.

13. A non-transitory computer-readable medium having processor-executable instructions stored thereon for encoding, wherein the processor-executable instructions, when executed, facilitate performance of the following:

obtaining, by an encoding device, to-be-encoded data;

inputting, by the encoding device, the to-be-encoded data into a first encoding network to obtain a target parameter, wherein the target parameter comprises a parameter weight for convolution and non-linear activation of a second encoding network;

constructing, by the encoding device, the second encoding network based on the target parameter;

inputting, by the encoding device, the to-be-encoded data into the second encoding network to obtain a first feature; and encoding, by the encoding device, the first feature to obtain an encoded bitstream;

wherein the processor-executable instructions, when executed, further facilitate performance of the following:

rounding the first feature y to obtain an integer value $\hat{y}$ of the first feature; and performing probability estimation on the integer value $\hat{y}$ of the first feature to obtain an estimated probability distribution $p(\hat{y})$ of the integer value $\hat{y}$ of the first feature;

wherein $p(\hat{y})$ satisfies $p(\hat{y})=h(\hat{y}; \theta_h)$, where $h(\hat{y}; \theta_h)$ is an entropy estimation network.

14. The non-transitory computer-readable medium according to claim 13, wherein encoding the first feature comprises:

performing entropy encoding on the integer value of the first feature based on the estimated probability distribution of the integer value of the first feature to obtain the encoded bitstream.

15. The non-transitory computer-readable medium according to claim 14, wherein performing probability estimation on the integer value of the first feature is based on first information comprising at least one of context information or side information.

16. The non-transitory computer-readable medium according to claim 13, wherein the first encoding network comprises a convolution kernel generator.

17. The non-transitory computer-readable medium according to claim 13, wherein the first feature is a three-dimensional feature map of the to-be-encoded data.

18. The non-transitory computer-readable medium according to claim 13, wherein the first feature is y, and y satisfies $y=g_a(x; \theta_g)$, where the target parameter is $\theta_g$, the to-be-encoded data is x, and the second encoding network is $g_a(x; \theta_g)$.

19. The non-transitory computer-readable medium according to claim 13, wherein the processor-executable instructions, when executed, further facilitate performance of the following:

inputting the integer value $\hat{y}$ of the first feature into a decoding network $g_s(\hat{y}; \varphi)$ to obtain decoded data $\hat{X}$, where the decoded data $\hat{x}$ satisfies $\hat{x}=g_s(\hat{y}; \varphi)$, where $\varphi$ comprises one or more parameter weights for convolution and non-linear activation of the second encoding network.

20. The non-transitory computer-readable medium according to claim 13, wherein the encoded data corresponds to a compressed version of the to-be-encoded data.

* * * * *